(12) United States Patent
Kimizuka et al.

(10) Patent No.: US 12,394,041 B2
(45) Date of Patent: Aug. 19, 2025

(54) SYSTEM FOR DERIVING ELECTRICAL CHARACTERISTICS AND NON-TRANSITORY COMPUTER-READABLE MEDIUM

(71) Applicant: Hitachi High-Tech Corporation, Tokyo (JP)

(72) Inventors: Heita Kimizuka, Tokyo (JP); Yohei Nakamura, Tokyo (JP); Natsuki Tsuno, Tokyo (JP); Muneyuki Fukuda, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 0 days.

(21) Appl. No.: 18/315,046

(22) Filed: May 10, 2023

(65) Prior Publication Data

US 2023/0274417 A1 Aug. 31, 2023

Related U.S. Application Data

(63) Continuation of application No. 16/904,309, filed on Jun. 17, 2020, now Pat. No. 11,694,325.

(30) Foreign Application Priority Data

Aug. 7, 2019 (JP) .................................. 2019-145053

(51) Int. Cl.
*G06T 7/00* (2017.01)
(52) U.S. Cl.
CPC .... *G06T 7/001* (2013.01); *G06T 2207/10152* (2013.01); *G06T 2207/30148* (2013.01)
(58) Field of Classification Search
CPC ........... G06T 2207/30148; G06T 7/001; G06T 2207/30108; G06T 2207/30141; G06T 2207/30144; G06T 2207/10152
See application file for complete search history.

(56) References Cited

U.S. PATENT DOCUMENTS

2006/0082763 A1 4/2006 Teh et al.
2006/0245636 A1 11/2006 Kitamura
(Continued)

FOREIGN PATENT DOCUMENTS

CN 103439346 A 12/2013
JP 2002-124555 A 4/2002
(Continued)

OTHER PUBLICATIONS

An machine translated English version of JP 2011014798 (Year: 2011).*

(Continued)

*Primary Examiner* — Ruiping Li
(74) *Attorney, Agent, or Firm* — Crowell & Moring LLP

(57) ABSTRACT

An object of the present disclosure is to provide a system for deriving a type of defect of a semiconductor element and a non-transitory computer-readable medium. The system receives, from the image acquisition tool, image data obtained by sequentially irradiating a plurality of patterns provided on the semiconductor wafer with a beam and extracts characteristics of the plurality of patterns sequentially irradiated with a beam from the received image data, the characteristics being included in the image data, or receives characteristics of the plurality of patterns sequentially irradiated with a beam from the image acquisition tool, the characteristics being extracted from the image data (Step 603), and derives (Step 605) a type of a defect by referring to (Step 604) related information for the characteristics of the plurality of patterns, the related information storing the characteristics of the plurality of patterns and types of defects in association with each other.

14 Claims, 22 Drawing Sheets

(56) References Cited

U.S. PATENT DOCUMENTS

| | | | |
|---|---|---|---|
| 2016/0155852 A1* | 6/2016 | Yamazaki | H01L 29/24 257/43 |
| 2019/0073566 A1 | 3/2019 | Brauer | |
| 2019/0080445 A1 | 3/2019 | Onishi et al. | |

FOREIGN PATENT DOCUMENTS

| | | | |
|---|---|---|---|
| JP | 2006-258445 A | | 9/2006 |
| JP | 2011-154918 | | 8/2011 |
| JP | 4891036 B2 | | 3/2012 |
| JP | 2014-112087 A | | 6/2014 |
| JP | 2011014798 A | * | 6/2016 |
| TW | 201905731 A | | 2/2019 |
| TW | 201920944 A | | 6/2019 |

OTHER PUBLICATIONS

Korean-language Office Action issued in Korean Application No. 10-2020-0069028 dated Mar. 26, 2021 (five (5) pages).

Taiwanese-language Office Action issued in Taiwanese Application No. 109119793 dated Jun. 17, 2021 with partial English translation (23 pages).

Japanese-language Office Action issued in Japanese Application No. 2019-145053 dated Jan. 24, 2023 (five (5) pages).

* cited by examiner

[FIG. 2]
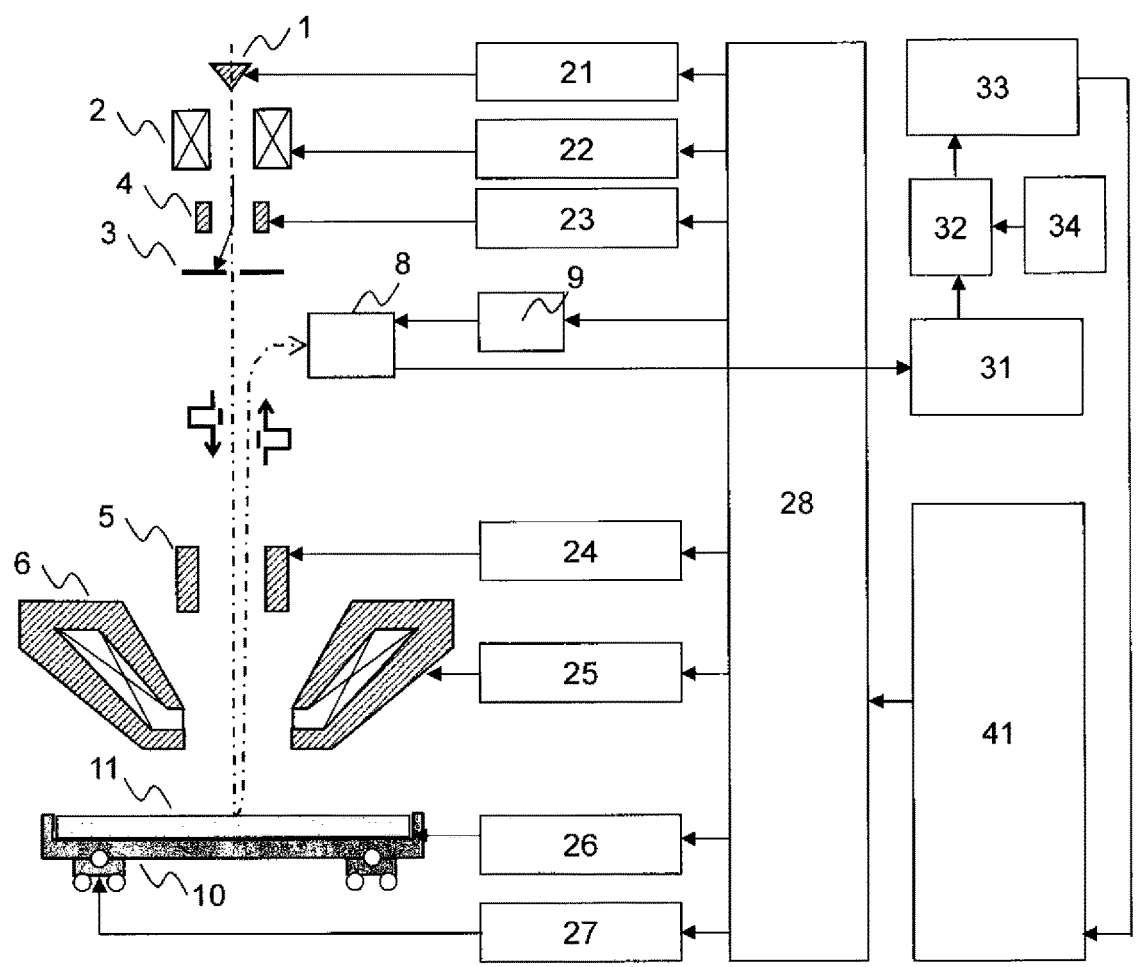

[FIG. 3]
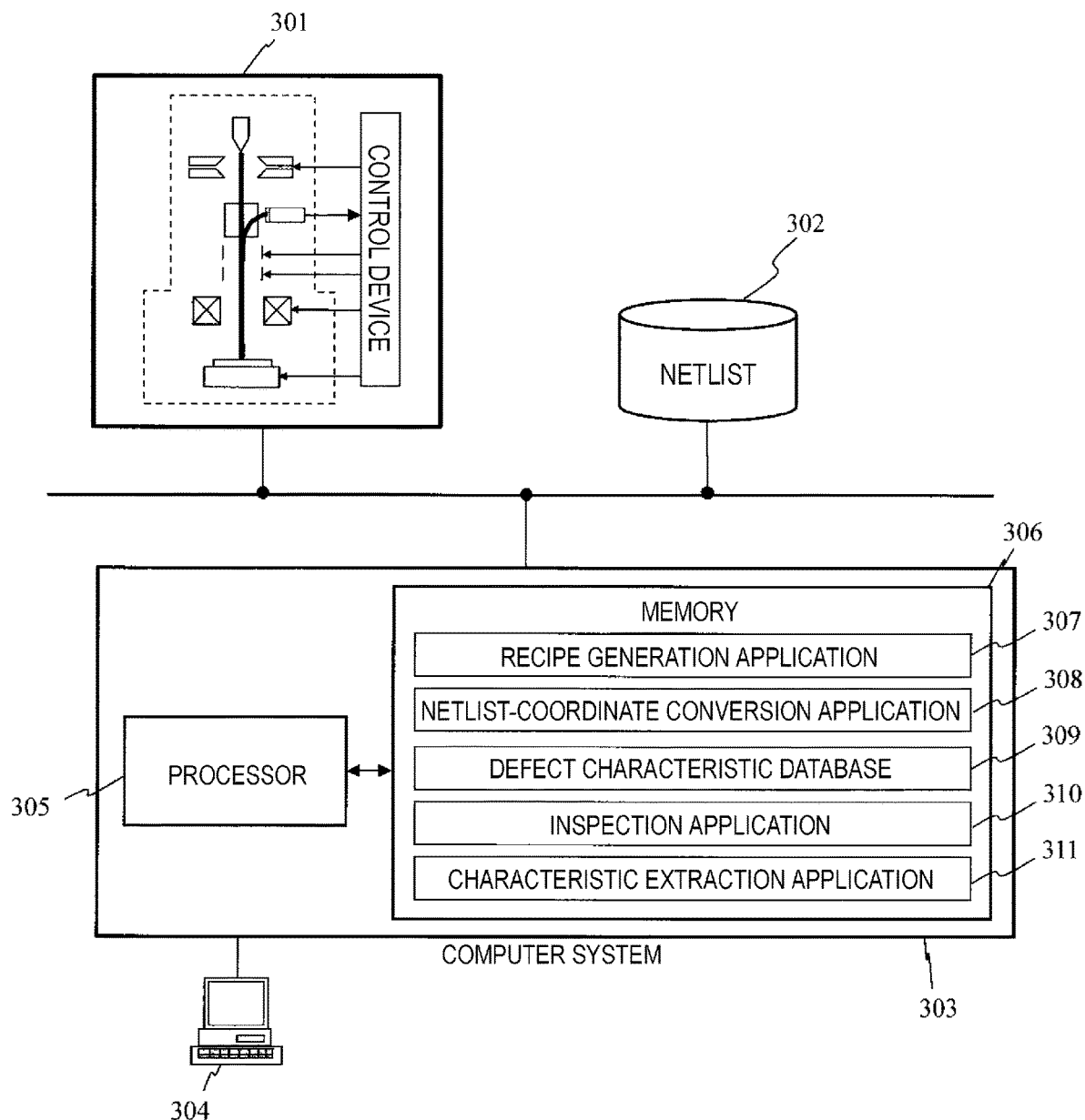

[FIG. 4]
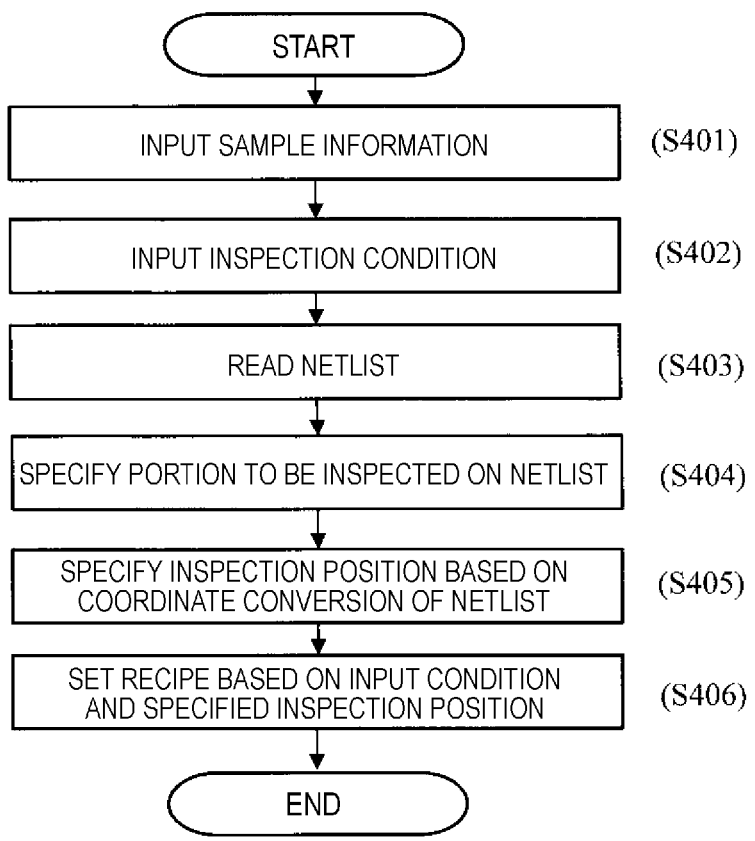

[FIG. 5]
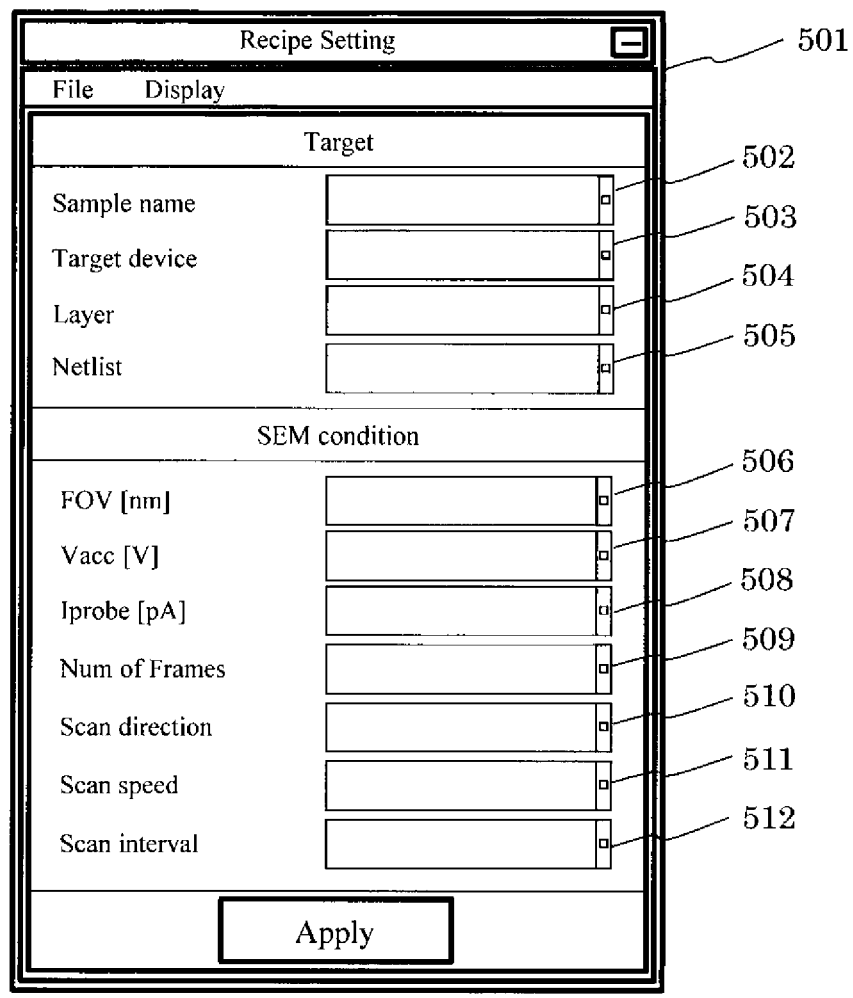

[FIG. 6]
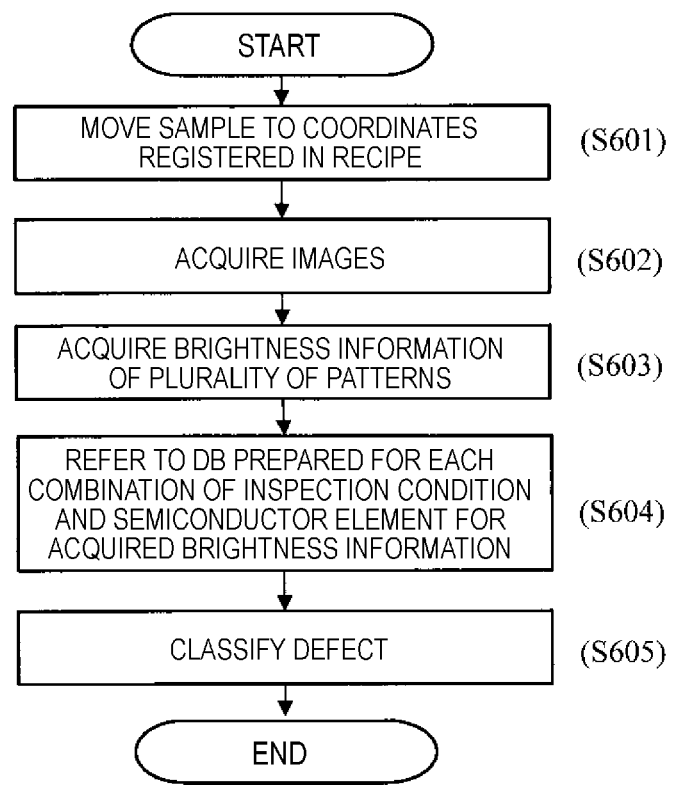

[FIG. 7]
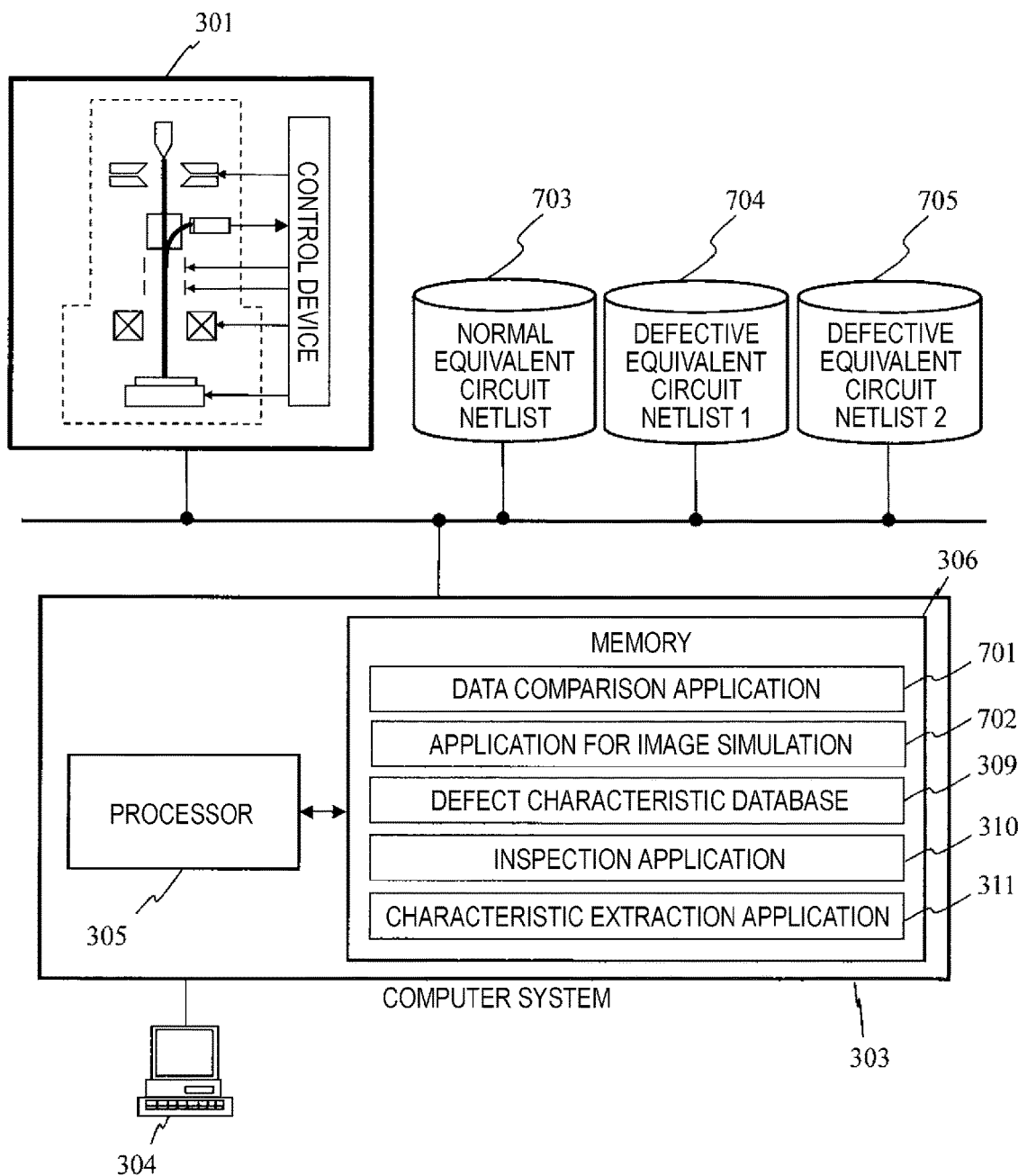

[FIG. 8]
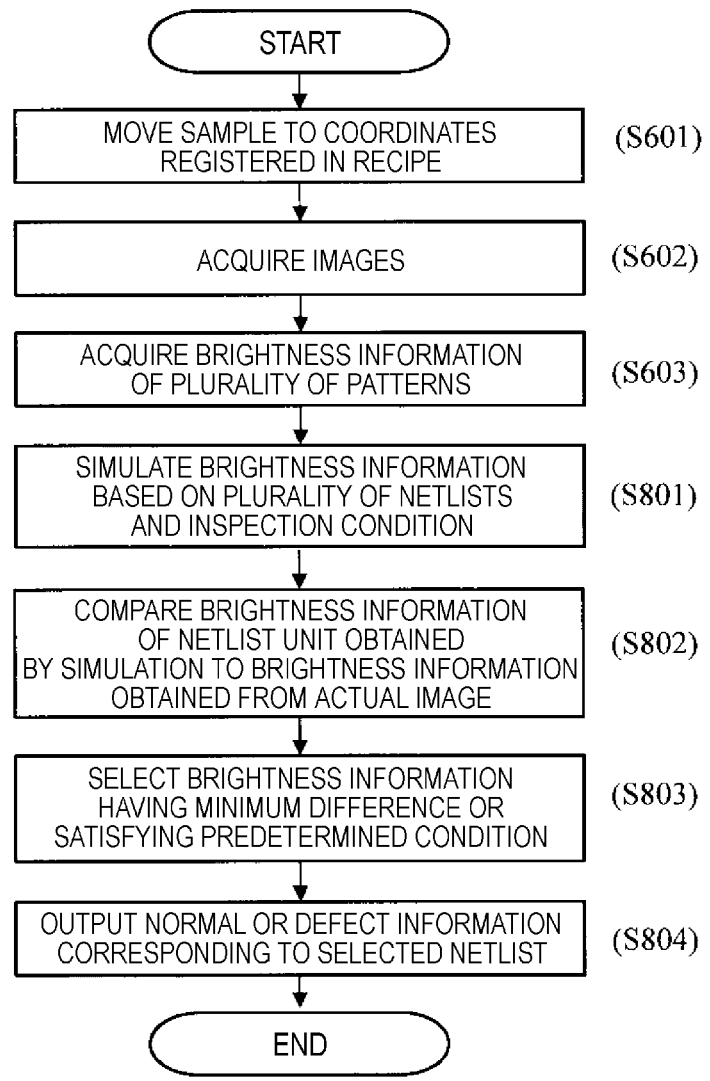

[FIG. 9]
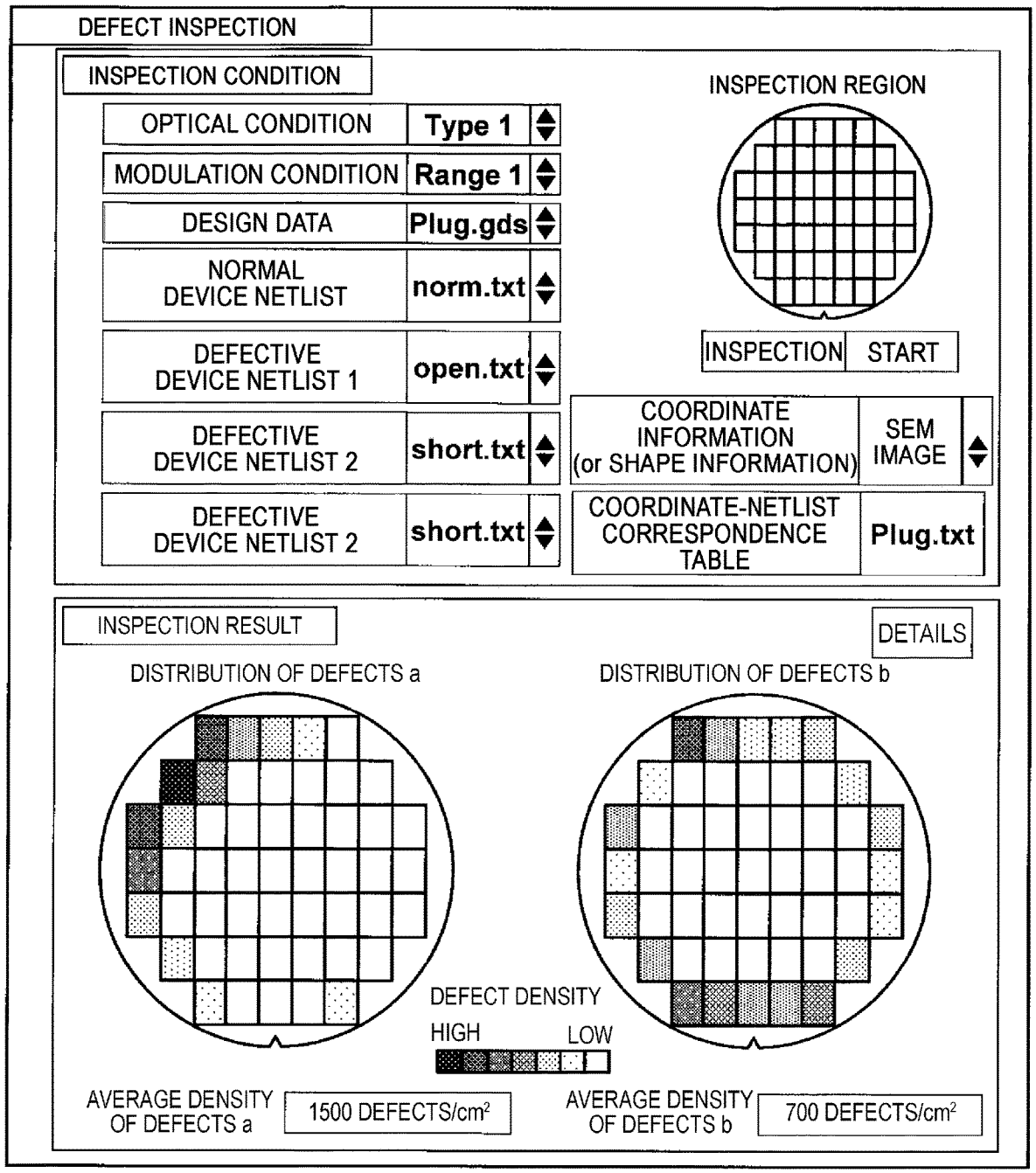

[FIG. 10]

| | | | | OPTICAL CONDITION | MODULATION CONDITION |
|---|---|---|---|---|---|
| DEFECT INSPECTION | | | | | |
| INSPECTION RESULT (DETAILS) | | | | Type 1 | Range 1 |
| COORDINATE-NETLIST CORRESPONDENCE TABLE | | Plug_ADC.txt | | | |

| No. | CHIP COORDI-NATES | DEFECT MODE | ELECTRON BEAM IRRADIATION RESULT | ESTIMATED IRRADIATION RESULT | RATE OF CONCOR-DANCE(%) |
|---|---|---|---|---|---|
| 1 | (0,1) | DEFECT 1 | | | 95 |
| 2 | (0,11) | DEFECT 2 | | | 94 |
| 3 | (2,8) | DEFECT 2 | | | 96 |
| 4 | (-6,5) | DEFECT 2 | | | 91 |

[FIG. 11]
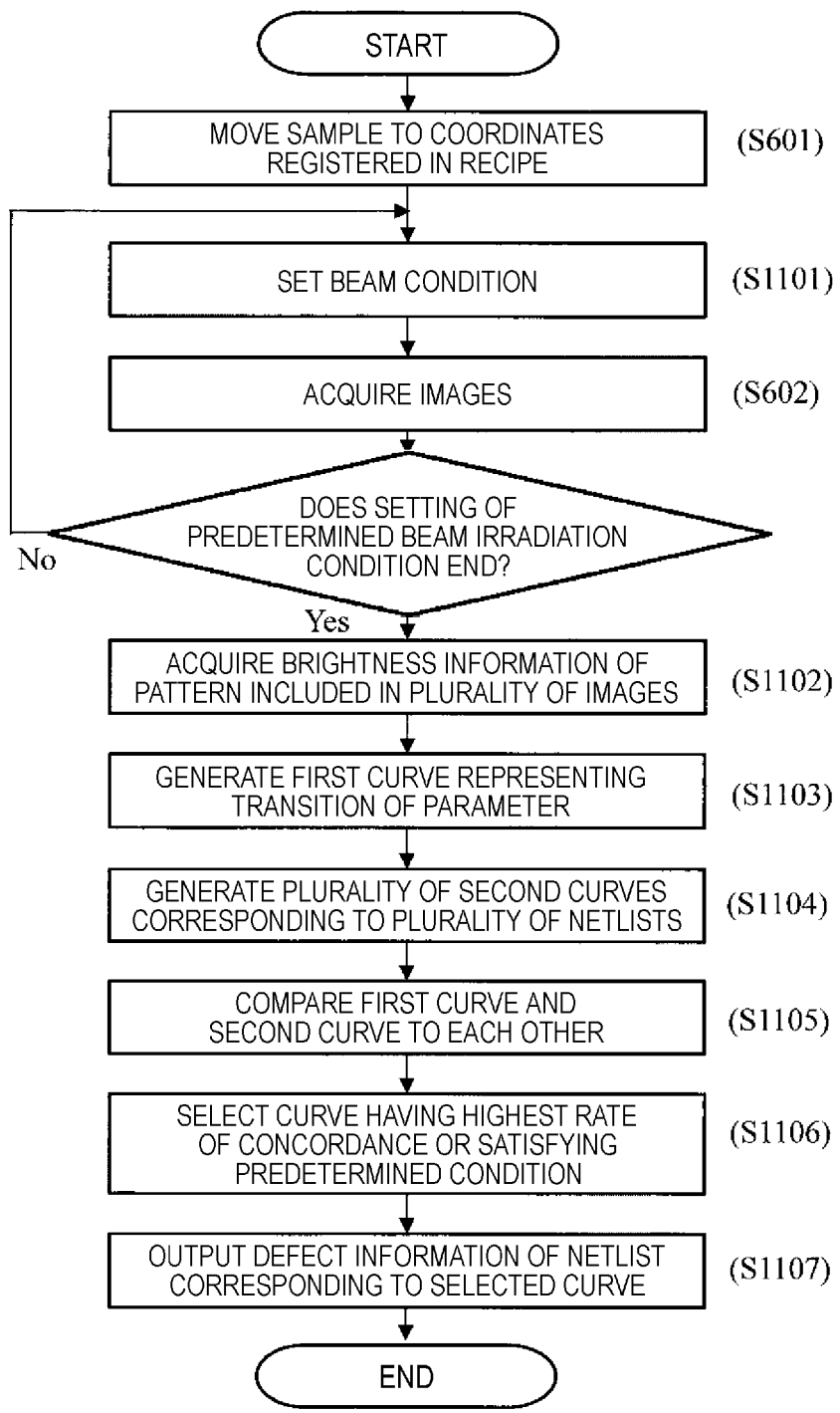

[FIG. 12]
| No. | CHIP COORDI-NATES | DEFECT MODE | ELECTRON BEAM IRRADIATION RESULT (PLOT) ESTIMATED IRRADIATION RESULT (BROKEN LINE) | RATE OF CONCOR-DANCE (%) |
|---|---|---|---|---|
| | | | DEFECT INSPECTION | |
| | | | INSPECTION RESULT (DETAILS) | |
| 0 | (0,0) | [Ref] NORMAL | 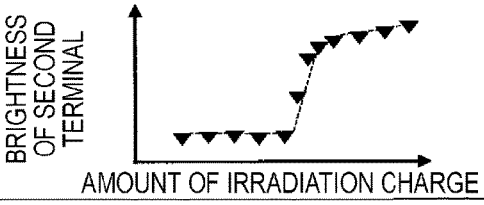 | 92 |
| 1 | (-3,7) | DEFECT 1 | 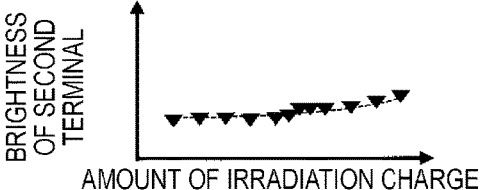 | 89 |
| 2 | (5,-2) | DEFECT 2 | 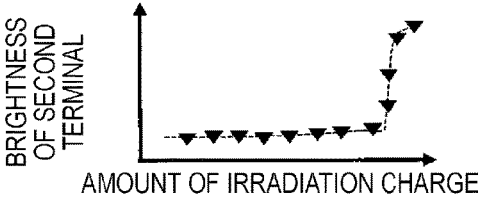 | 93 |
| 3 | (0,11) | DEFECT 3 | 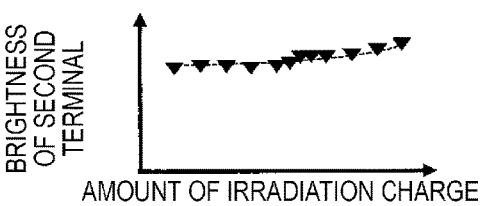 | 87 |

[FIG. 13]
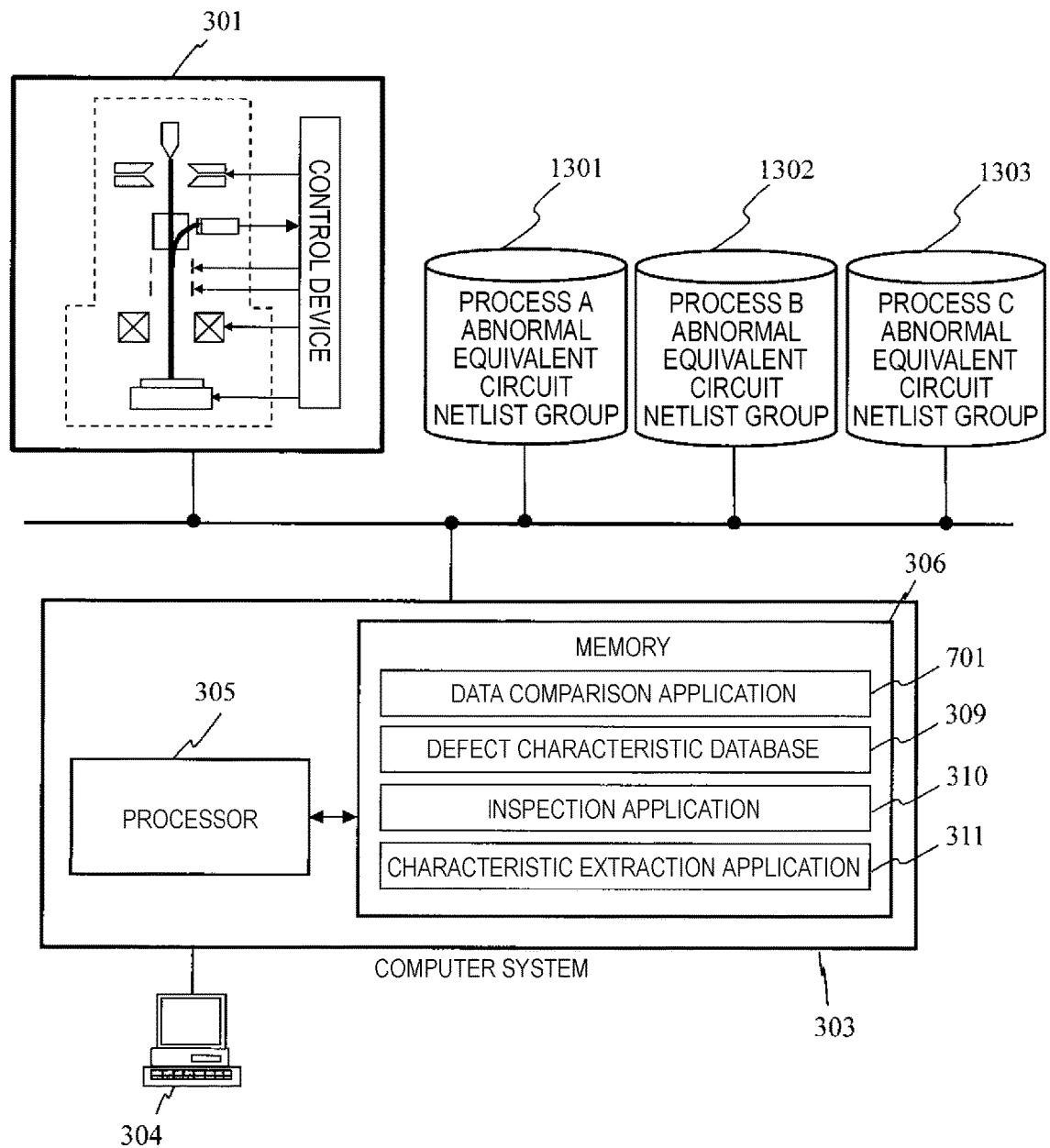

[FIG. 14]
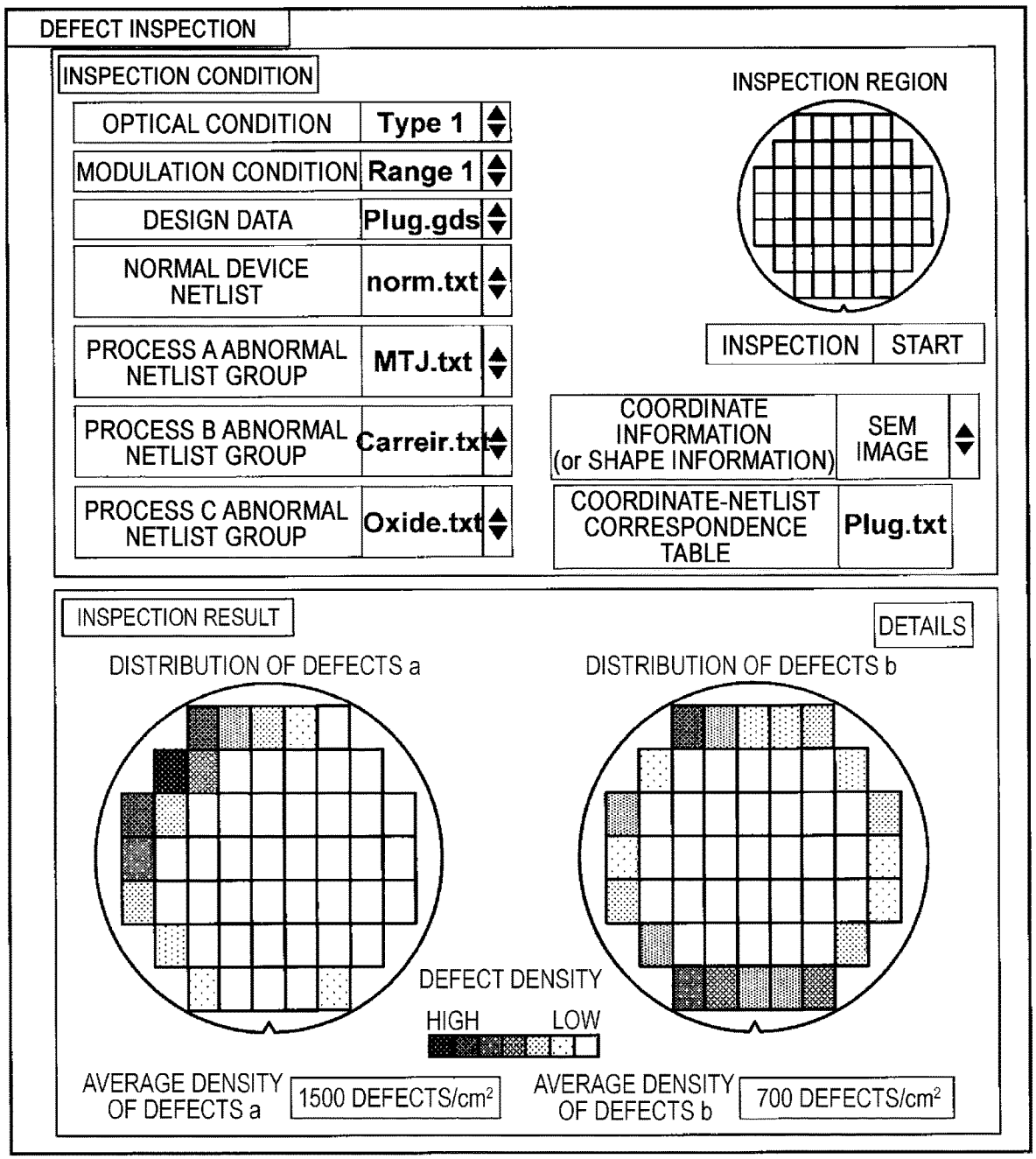

[FIG. 15]
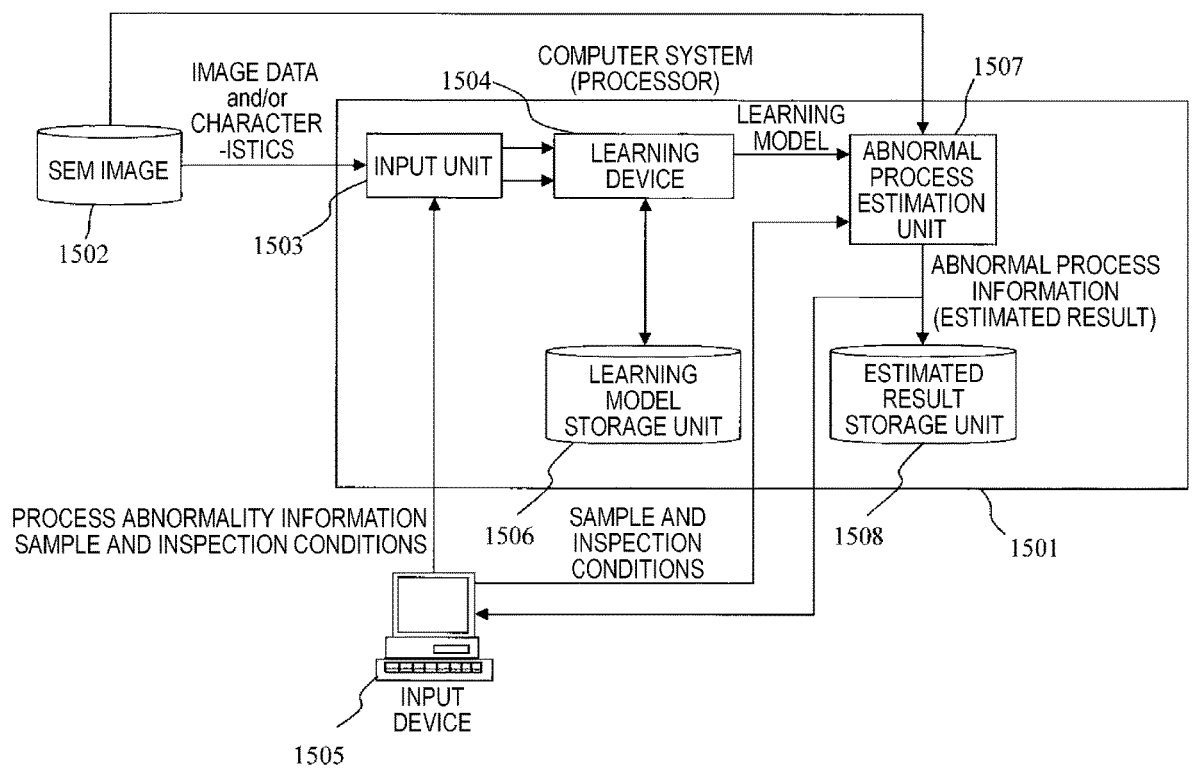

[FIG. 16]
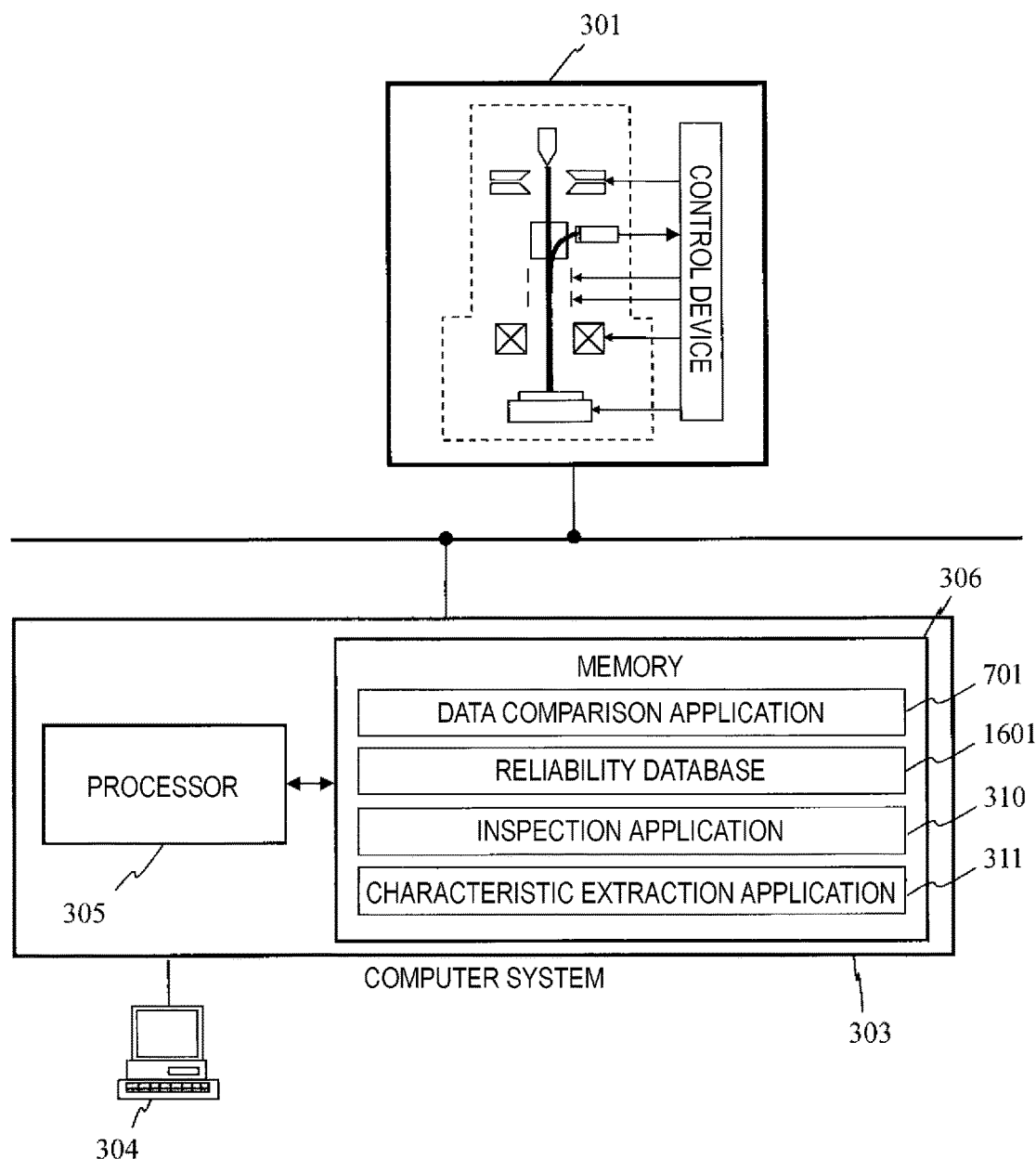

[FIG. 17]
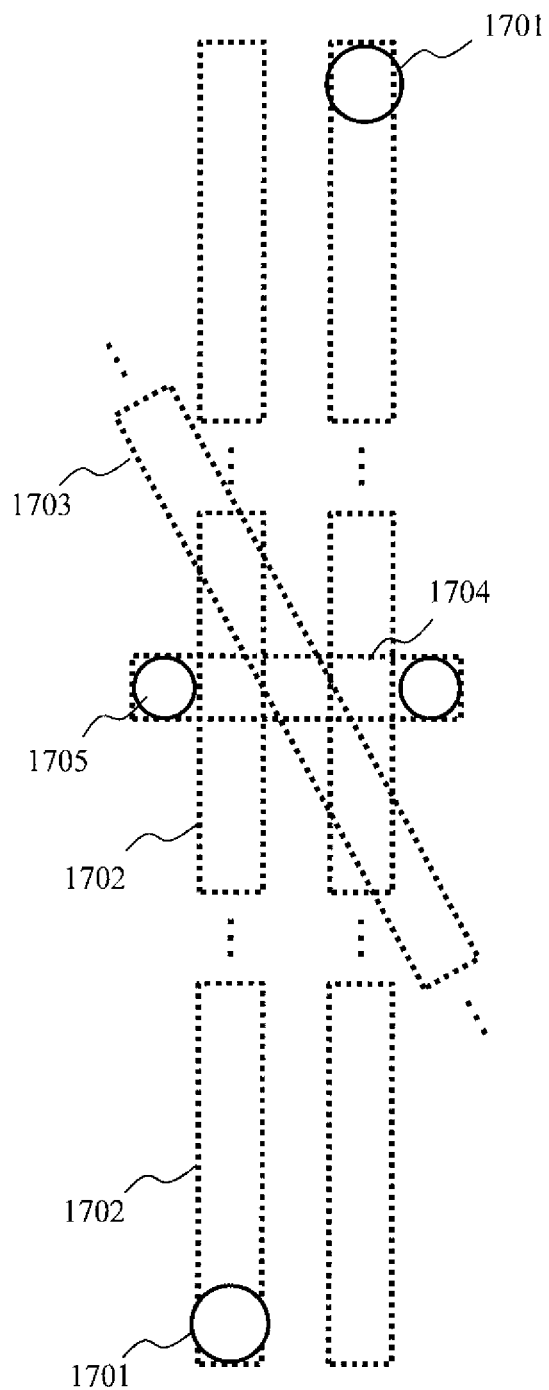

[FIG. 18]
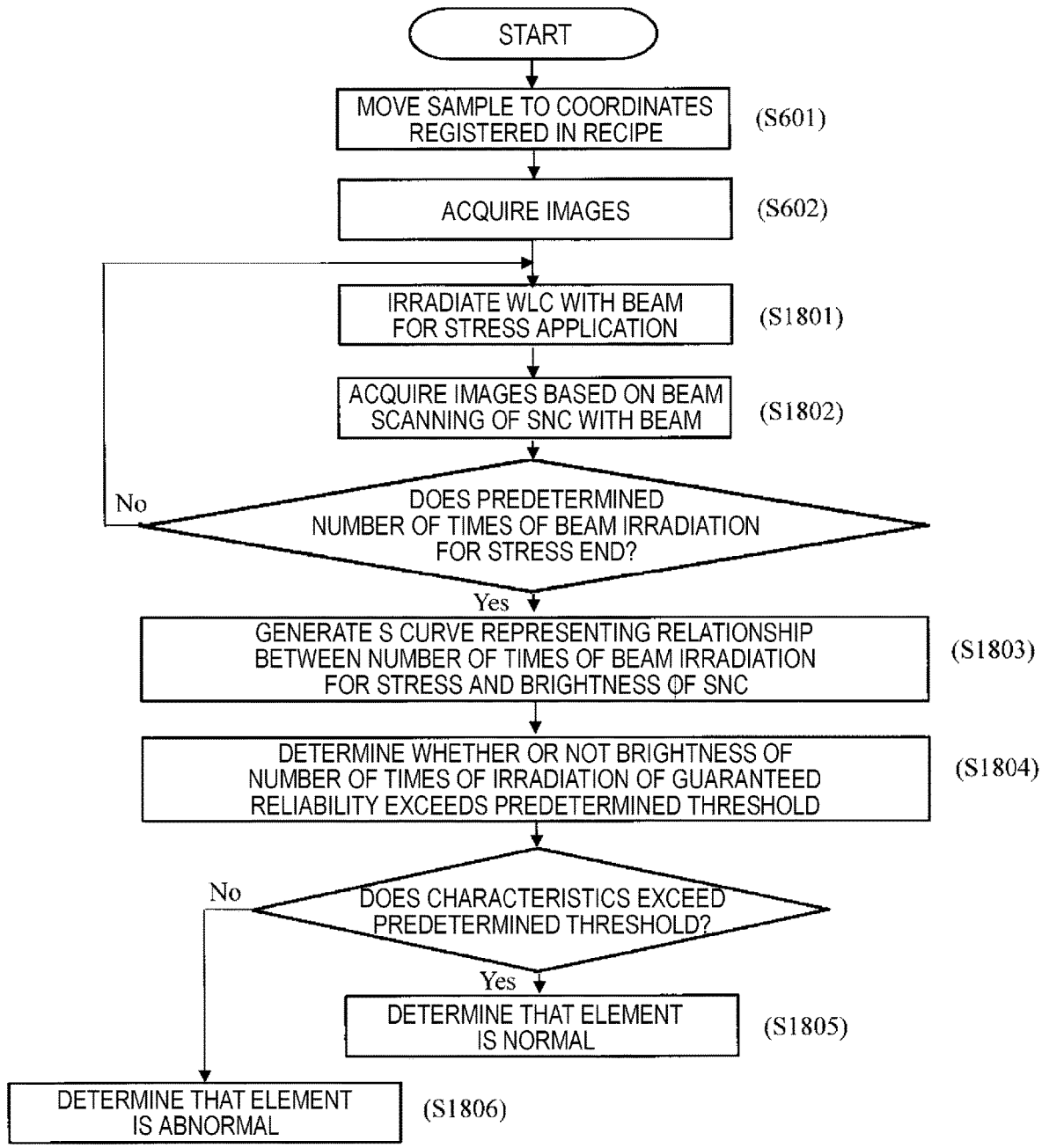

[FIG. 19]

DEFECT INSPECTION

INSPECTION RESULT (DETAILS)

| IRRADIATION TIME | INTER-IRRADIATION POINT TIME |
|---|---|
| Range 2 | Range 4 |

| No. | CHIP COORDI-NATES | DEFECT MODE | RELIABILITY DETERMINATION RESULT | NUMBER OF TIMES OF IRRADIATION DURING MALFUNCTION |
|---|---|---|---|---|
| 1 | (4,4) | DEFECT 1 | 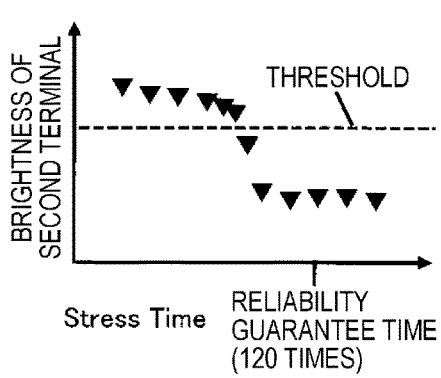 Brightness of second terminal vs Stress Time; THRESHOLD; RELIABILITY GUARANTEE TIME (120 TIMES) | 87 |
| 2 | (8,-1) | DEFECT 2 | 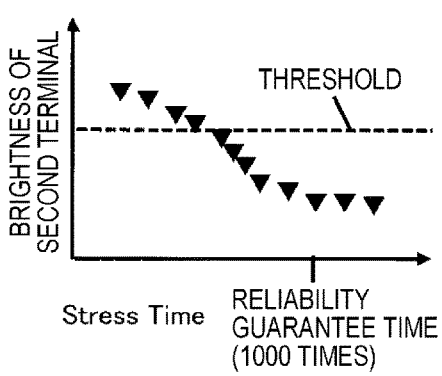 Brightness of second terminal vs Stress Time; THRESHOLD; RELIABILITY GUARANTEE TIME (1000 TIMES) | 445 |

[FIG. 21]
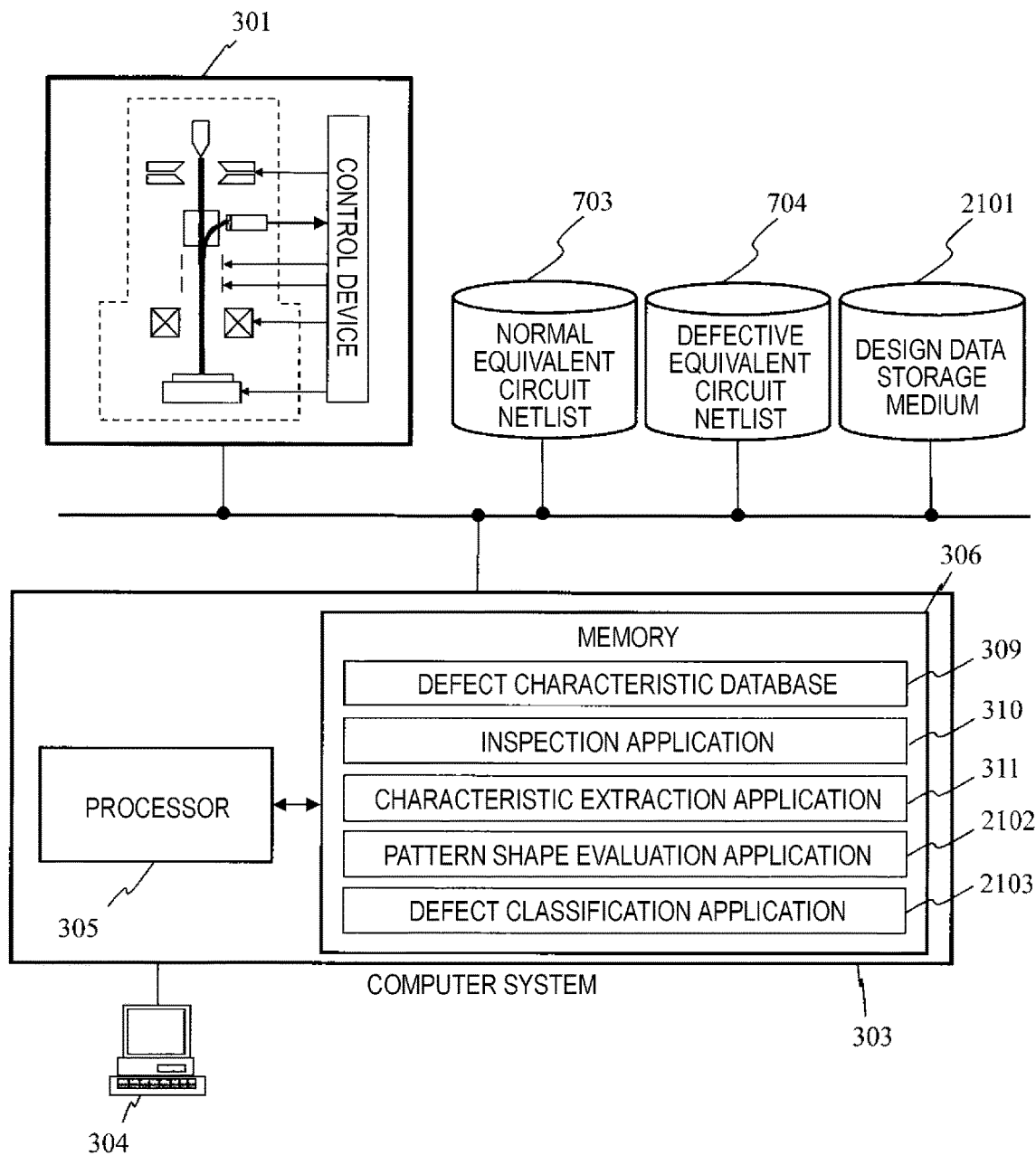

[FIG. 22]
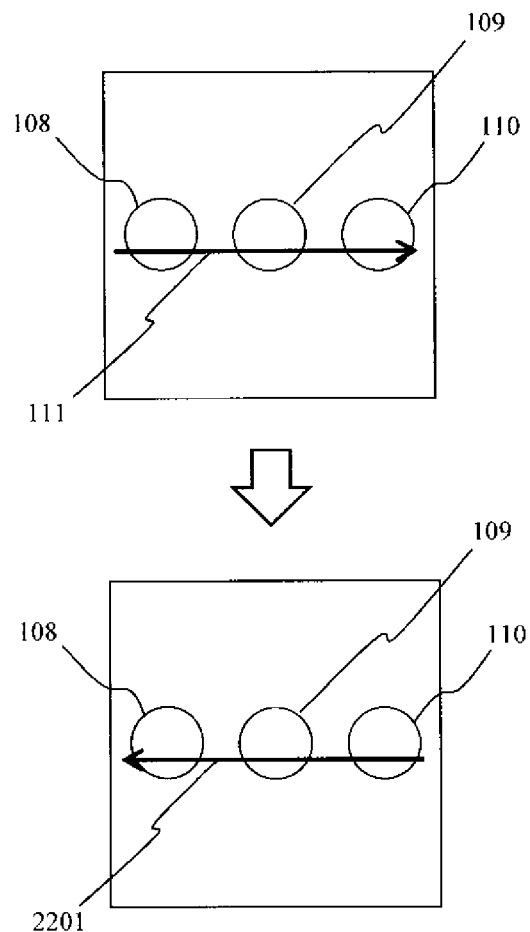

SYSTEM FOR DERIVING ELECTRICAL CHARACTERISTICS AND NON-TRANSITORY COMPUTER-READABLE MEDIUM

CROSS REFERENCE TO RELATED APPLICATIONS

This application is a Continuation of U.S. patent application Ser. No. 16/904,309, filed Jun. 17, 2020, which claims priority to Japanese Patent Application No. 2019-145053, filed Aug. 7, 2019, the disclosures of all of which are expressly incorporated by reference herein.

TECHNICAL FIELD

The present disclosure relates to a system for deriving electrical characteristics and a non-transitory computer-readable medium, and, in particular, relates to a system for deriving electrical characteristics from characteristics obtained from image data and a non-transitory computer-readable medium.

BACKGROUND ART

When an image is formed using an electron microscope, a pattern is irradiated with a beam to charge the pattern, and a difference in brightness between the charged pattern and other portions is clarified such that the specific pattern in the image can be highlighted. This image is called a voltage contrast (VC) image. PTL 1 discloses a method of estimating electrical characteristics of a defect portion using a correspondence between a voltage contrast image and electrical characteristics of the defect portion. In particular, PTL 1 describes that a netlist including information regarding electrical characteristics of a circuit element and a connection relationship is generated based on layout data of a sample.

CITATION LIST

Patent Literature

PTL 1: Japanese Patent No. 4891036

SUMMARY OF INVENTION

Technical Problem

In the method disclosed in PTL 1, an influence of an interaction between a plurality of devices through a device on a lower layer on a VC image is not considered. Therefore, when a main factor of the voltage contrast is the interaction between a plurality of devices, electrical characteristics of a defect portion cannot be estimated, and the type of a defect of an element cannot be derived. Hereinafter, a system that derives electrical characteristics in order to derive the type of a defect of an element formed on a sample based on voltage contrast acquisition, and a non-transitory computer-readable medium will be described.

Solution to Problem

According to one aspect for achieving the object, there is provided a system that detects a defect of an electric circuit formed on a semiconductor wafer from image data acquired from an image acquisition tool or characteristics extracted from the image data. The system receives, from the image acquisition tool, image data obtained by sequentially irradiating a plurality of patterns provided on the semiconductor wafer with a beam and extracts characteristics of the plurality of patterns sequentially irradiated with a beam from the received image data, the characteristics being included in the image data, or receives characteristics of the plurality of patterns sequentially irradiated with a beam from the image acquisition tool, the characteristics being extracted from the image data, and derives a type of a defect by referring to related information for the characteristics of the plurality of patterns, the related information storing the characteristics of the plurality of patterns and types of defects in association with each other.

Advantageous Effects of Invention

With this configuration, a type of a defect of an element formed on a sample can be specified.

BRIEF DESCRIPTION OF DRAWINGS

FIG. 2 is a diagram showing an example of a system including a scanning electron microscope.

FIG. 3 is a diagram showing an example of an electrical characteristic derivation system.

FIG. 4 is a flowchart showing an inspection recipe generation process.

FIG. 5 is a diagram showing an example of an inspection recipe setting screen.

FIG. 6 is a flowchart showing an inspection process using the inspection recipe.

FIG. 7 is a diagram showing another example of the electrical characteristic derivation system.

FIG. 8 is a flowchart showing a process of outputting defect information based on a comparison between characteristics that are obtained based on beam scanning on a plurality of patterns and characteristics of a plurality of patterns that are derived from a netlist.

FIG. 9 is a diagram showing an example of a GUI screen through which the setting of an inspection condition and the display of an inspection result are executed.

FIG. 10 is a diagram showing an example of a GUI screen on which an electron microscope image and an estimated image derived from a netlist are displayed as an inspection result FIG. 11 is a flowchart showing a process of specifying defect information from brightness information obtained when a plurality of patterns are irradiated with a beam under a plurality of beam irradiation conditions.

FIG. 12 is a diagram showing an example of a GUI screen on which a change in characteristics of a pattern depending on a change in beam condition is displayed.

FIG. 13 is a diagram showing an example of an electrical characteristic derivation system in which a netlist group including a plurality of netlists is prepared in units of manufacturing processes of a semiconductor.

FIG. 14 is a diagram showing an example of a GUI screen through which a netlist group can be selected depending on different processes.

FIG. 15 is a diagram showing an example of a system for estimating an abnormal process among semiconductor manufacturing processes.

FIG. 16 is a diagram showing still another example of the electrical characteristic derivation system.

FIG. 17 is a diagram showing a configuration of a DRAM.

FIG. 18 is a flowchart showing a DRAM reliability evaluation process.

FIG. 19 is a diagram showing an example of a GUI screen through which a reliability determination result of a semiconductor element is displayed as an inspection result.

FIG. 21 is a diagram showing an example of a system for classifying a type of a defect.

FIG. 22 is a diagram showing an example of a scanning trajectory when a plurality of patterns are scanned with a beam in a plurality of directions.

DESCRIPTION OF EMBODIMENTS (a) of FIG. 1 is a diagram showing an example of an electron microscope image of a pattern formed on a semiconductor wafer. In addition, (b) of FIG. 1 is a diagram showing an A-A cross-section of (a) of FIG. 1. FIG. 1 shows a simple structure of a transistor formed on a semiconductor wafer. Diffusion layers 102 and 103 are stacked on a well 101, and a gate electrode 105 is formed over the diffusion layers 102 and 103 through a gate oxide film 104. In addition, a side wall 106 is formed on a side wall of the gate electrode 105. Further, an electrode (a source contact 108 (first terminal), a gate contact 109 (second terminal), and a drain contact 110 (second terminal)) in contact with each of the diffusion layer 102, the gate electrode 105, and the diffusion layer 103 is formed with an interlayer oxide film 107 interposed therebetween.

Figure 1A:
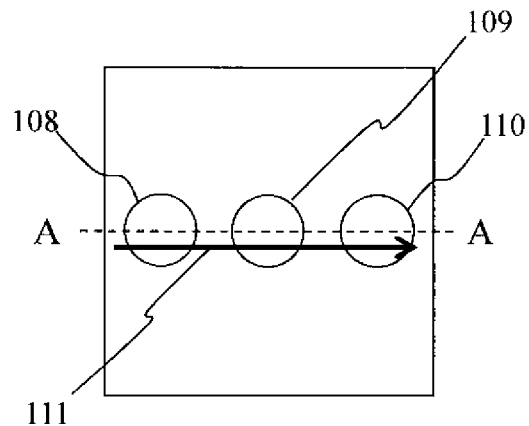
FIGS. 1A and 1B show an electron microscope image of a pattern formed on a semiconductor wafer and a cross-section of the electron microscope image.
Figure 1B:
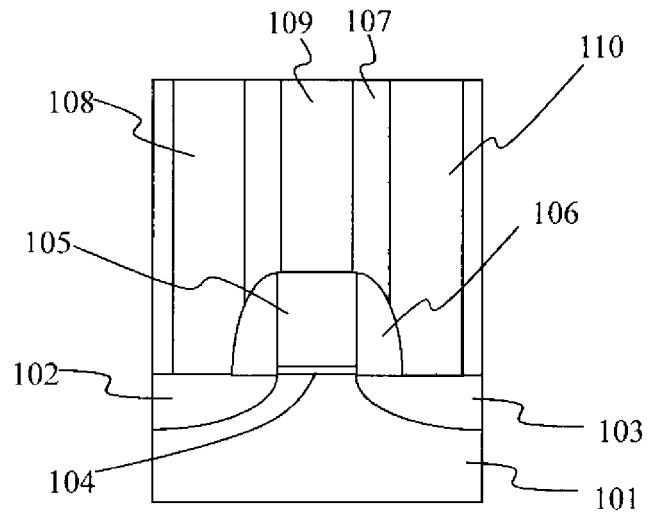

When a sample is scanned with an electron beam along a scanning trajectory 111 as shown in FIG. 1, first, the electron beam passes through the source contact 108, subsequently passes through the gate contact 109, and finally reaches the drain contact 110. In this way, respective patterns are present at different positions and thus are sequentially irradiated with a beam at different timings.

While the source contact 108 among the respective contacts as the terminals of the transistor is being irradiated with a beam, secondary electrons are emitted from the source contact 108. When the amount of secondary electrons is more than the amount of electrons to be incident, the source contact 108 is positively charged, the electrons emitted from the positively charged source contact 108 return to the sample side, and the source contact 108 is darker than an energized electrode. Next, when the gate contact 109 is irradiated with a beam, charge is accumulated in the gate, and thus, the gate contact 109 is also darker than an energized electrode.

When the drain contact 110 is irradiated with a beam, the gate is opened because the gate contact 109 is previously irradiated with a beam and charge is accumulated therein. The drain contact 110 is electrically connected to the source contact 108, and thus charge is not accumulated therein. As a result, the drain contact 110 is brighter than the source contact 108.

In addition, when the gate electrode 105 and the gate contact 109 that are supposed to be connected to each other are not connected (open defect), the gate is not opened even when charge is accumulated in the gate contact 109. Therefore, the drain contact 110 is also dark as in the source contact 108.

Since a brightness condition significantly changes depending on a beam irradiation condition, the above description is merely one example. However, when a plurality of elements (in this example, the contacts) connected to a semiconductor element are irradiated with a beam in a specific direction or in a specific order, an image corresponding to the type of a defect of the semiconductor element is formed.

In the embodiments described below, a system and a non-transitory computer-readable medium will be described. In the system, a plurality of characteristics (brightness information, contrast information) are extracted from images acquired when beam scanning is performed such that a plurality of patterns forming a semiconductor element are sequentially irradiated with a beam, and a type of a defect is calculated by referring to related information for the plurality of characteristics, the related information storing the plurality of characteristics and types of defects in association with each other.

Embodiment 1

FIG. 2 is a diagram showing an example of a system including a scanning electron microscope as one aspect of an image acquisition tool that acquires image data.

The scanning electron microscope is configured with an intermittent irradiation system, an electron optical system, a secondary electron detection system, a stage mechanism system, an image processing system, a control system, and an operation system. The intermittent irradiation system is configured with an electron beam source 1 (charged particle source) and a pulsed electron generator 4. In the present invention, the pulsed electron generator 4 is separately provided. However, an electron beam source that can radiate a pulsed electron can also be used. In addition, in the present embodiment, a pulsed beam is generated by using the pulsed electron generator 4 as a deflector that blocks irradiation of a sample with a beam and intermittently blocking the beam using a deflector. For example, a pulsed beam may be generated by changing a position of a movable diaphragm with high speed.

The electron optical system is configured with a condenser lens 2, a diaphragm 3, a deflector 5, an objective lens 6, and a sample electric field controller 7. The deflector 5 is provided to one-dimensionally or two-dimensionally scan the sample with the electron beam and is a target to be controlled as described below.

The secondary electron detection system is configured with a detector 8 and an output adjustment circuit 9. The stage mechanism system is configured with a sample stage 10 and a sample 11. The control system is configured with an acceleration voltage controller 21, an irradiation current controller 22, a pulse irradiation controller 23, a deflection controller 24, a focusing controller 25, a sample electric field controller 26, a stage position controller 27, and a control transmitter 28. The control transmitter 28 controls writing of a control value to each of the controllers based on input information input from an operation interface 41.

Here, the pulse irradiation controller 23 controls an irradiation time that is a time for which an electron beam is continuously radiated, an irradiation distance that is a distance by which an electron beam is continuously radiated, a blocking time that is a time between irradiation and irradiation of an electron beam, or an inter-irradiation point distance that is a distance interval between irradiation and irradiation of an electron beam. In the present embodiment, the pulse irradiation controller 23 controls the irradiation time that is a time for which an electron beam is continuously radiated and the blocking time that is a time between irradiation and irradiation of an electron beam.

The image processing system is configured with a detection signal processing unit 31, a detection signal analysis unit 32, an image or electrical characteristic display unit 33, and a database 34. The detection signal processing unit 31 or the detection signal analysis unit 32 of the image processing system includes one or more processors and executes an arithmetic operation of brightness of a designated inspection pattern, an arithmetic operation of a difference in brightness between a plurality of inspection patterns, or an arithmetic operation of analyzing or classifying electrical characteristics based on brightness or a difference in brightness. The database 34 of the image processing system is a storage medium that stores calibration data when the arithmetic operation or the like of analyzing electrical characteristics is executed such that the calibration data is read and used during the arithmetic operation.

A control described below, image processing, and the like are executed by one or more computer systems including one or more processors. The one or more computer systems are configured to execute an arithmetic module stored in a predetermined storage medium (computer-readable medium) in advance, and automatically or semi-automatically execute a process as described below. Further, the one or more computer systems are configured to be communicable with the image acquisition tool.

FIG. 3 is a diagram showing one example of an electrical characteristic derivation system. The system shown in FIG. 3 includes an image acquisition tool 301 such as a scanning electron microscope, a netlist storage medium 302, and a computer system 303. A netlist stored in the netlist storage medium 302 is data including electrical characteristics of a circuit element forming an equivalent circuit and connection information between terminals in the equivalent circuit. The present embodiment describes an example in which a position or a region to be inspected is specified using the netlist, and when a defect is detected, information thereof is recorded in the netlist. Respective components forming this system are connected to each other through a bus or network.

In the computer system 303, a memory 306 that stores a module (application) required for a defect inspection and one or more processors 305 that execute a module or an application stored in the memory 306 are built. Further, the computer system 303 includes an input/output device 304 that inputs information required for an inspection and outputs an inspection result or the like.

The memory 306 stores a recipe generation application 307 (also referred to as a component) that generates an operation program (inspection recipe) of the image acquisition tool 301 during inspection of a sample such as a semiconductor wafer based on an sample condition or an inspection condition input from the input/output device 304 and information acquired from the netlist. In addition, the memory 306 stores a netlist-coordinate conversion application 308 which derives coordinates of an element forming a semiconductor element (for example, an element such as CMOS or STT-MRAM) designated by the input device 304 or coordinates a region including a terminal of the element based on a correspondence table (database) between the semiconductor element on the netlist and actual coordinates on a semiconductor wafer.

FIG. 4 is a flowchart showing an inspection recipe generation process. FIG. 5 is a diagram showing an example of an inspection recipe setting screen. A GUI screen 501 is displayed on, for example, a display device provided in the input/output device 304. In the GUI screen 501, a display field for setting a type (sample information) of a semiconductor element (target) to be inspected and an input field for inputting a device condition (inspection condition) of the image acquisition tool are provided. In the present embodiment, the scanning electron microscope is adopted as the image acquisition tool. Therefore, a field of "SEM condition" is provided as the inspection condition.

In the input field of the sample information, an input field 502 for inputting information of the sample (for example, a semiconductor wafer), an input field 503 for inputting the type of the semiconductor element, an input field 504 for inputting layer information of the semiconductor wafer, and an input field 505 for inputting the type of the netlist are provided. The recipe generation application 307 reads the corresponding netlist from the netlist storage medium 302 based on the input sample information and the input layer information (Steps 401, 402, and 403).

Further, the netlist-coordinate conversion application 308 searches for the input semiconductor element in the read netlist and specifies the coordinates of the semiconductor element on the semiconductor wafer (Steps 404 and 405). The recipe generation application 307 generates a recipe such that the field of view (FOV) of the scanning electron microscope is positioned at the specified coordinates (Step 406). Specifically, a driving condition or the like of a sample stage provided in the scanning electron microscope is set such that the selected element is positioned immediately below an electron beam.

In addition, in the input field of the inspection condition, an input field 506 for setting the size of the FOV, an input field 507 for inputting an acceleration voltage of the electron beam, an input field 508 for inputting a probe current of the electron beam, an input field 509 for inputting the number of frames (the cumulative number of images), an input field 510 for setting a scan direction of a beam, an input field 511 for setting a scan speed of a beam, and an input field 512 for setting a blocking time of a pulsed beam are provided.

The recipe generation application 307 generates a recipe such that the specified coordinates are irradiated with a beam under the inspection condition input to the input field of the inspection condition (Step 406). More specifically, for example, an extraction electrode in the scanning electron microscope, a voltage applied to an acceleration electrode, and a scanning signal supplied to a scanning deflector are set based on the input inspection condition.

FIG. 6 is a flowchart showing an inspection process using the recipe generated as described above. In the scanning electron microscope, first, the sample stage on which the semiconductor wafer as the target to be inspected is placed is operated such that a field of view position registered in the recipe is irradiated with a beam (Step 601). Next, by controlling the scanning deflector and one-dimensionally or two-dimensionally scanning the sample with a beam, a signal waveform or images is acquired (Step 602). At this time, beam scanning is performed such that a plurality of terminals of the element to be inspected are included in the field of view. In addition, the beam scanning is performed such that scanning with a beam is performed with respect to the arrangement of patterns from a set direction, and a control device provided in the scanning electron microscope controls the scanning deflector and a blanking deflector such that scanning with a pulsed beam having a set scan speed and a set blocking time is performed.

In the present embodiment, the example in which beam scanning is performed along a scanning trajectory such that the beam is radiated in an arrangement direction of the patterns according to the arrangement order has been described. However, the present disclosure is not limited to this example, another beam irradiation method of irradiating patterns forming one element or a terminal of the element with a beam at different timings may be adopted.

Next, a characteristic extraction application 311 shown in FIG. 3 extracts characteristics of a plurality of patterns from the signal waveform or the image data (Step 603). As the characteristics, brightness of a plurality of patterns, a contrast to a reference lightness (brightness ratio), an increase rate in brightness to the number of times of scanning, a pattern dimension or shape, and the like can be considered. An inspection application 310 executes defect classification by referring to a database for a combination of a plurality of characteristics extracted from the signal waveform or the image, the database storing a type of a defect and the combination of the plurality of characteristics in association with each other (Steps 604 and 605).

A defect characteristic database 309 stores a plurality of different databases depending on sample conditions or inspection conditions, and the inspection application 310 selects an appropriate database corresponding to a sample condition or an inspection condition set during the generation of the recipe and performs defect classification or specifies a type of a defect by referring to the selected database for the extracted plurality of characteristics.

By sequentially irradiating the plurality of patterns with a beam as described above, the semiconductor element is allowed to function, and the state thereof is evaluated. As a result, whether or not a defect is present can be specified or defect classification can be performed.

In the present embodiment, the example of irradiating a plurality of patterns with a beam according to a desired order by allowing a scan direction to vary has been described. However, the present disclosure is not limited to this example. Even when the scan direction is fixed, determination on whether or not a defect is present or defect classification can be performed by storing how characteristics of a pattern are derived due to the scan direction in the database in advance. In the configuration in which a plurality of patterns are irradiated with a beam at different timings, the above-described defect classification can be realized.

Embodiment 2

FIG. 7 is a diagram showing another example of the electrical characteristic derivation system. The system shown in FIG. 7 is different from the system shown in FIG. 3, in that a storage medium of a normal electronic device equivalent circuit netlist (normal equivalent circuit netlist storage medium 703), a storage medium of a defective electronic device equivalent circuit netlist 1 (defective equivalent circuit netlist 1 storage medium 704), and a storage medium of a defective electronic device equivalent circuit netlist 2 (defective equivalent circuit netlist 2 storage medium 705) are communicably connected to the computer system 303. In the defective electronic device equivalent circuit netlist, electrical characteristics of a circuit element forming an equivalent circuit including a defect and connection relationship information are recorded. In addition, a plurality of defective electronic device equivalent circuit netlists can be provided depending on types of defects. In the present embodiment, the electrical characteristics of the circuit element and the connection relationship information recorded in the defective electronic device equivalent circuit netlist are uniquely designated. However, a range of the electrical characteristics of the circuit element and a range of the connection relationship may be designated. Further, the memory 306 stores a data comparison application 701 that determines a rate of concordance between images or between netlists and an application 702 for image simulation.

The electrical characteristic derivation system derives electrical characteristics according to a flowchart shown in FIG. 8. Images are acquired according to the flowchart shown in FIG. 6, and brightness information of a plurality of patterns are acquired. Next, the computer system 303 reads the normal equivalent circuit netlist and one or more defective equivalent circuit netlists from the storage mediums of the respective netlists. The application 702 for image simulation simulates brightness information of a pattern to be inspected from the defect information (normal information) and the inspection information included in the netlist (Step 801).

In the defective equivalent circuit netlist, for example, a difference in electrical characteristics of a connection portion in the equivalent circuit is described as information. The application 702 for image simulation executes simulation of adjusting brightness by the difference in electrical characteristics from those of the normal circuit. In addition, since the brightness of a pattern during beam irradiation changes depending on inspection conditions such as a beam irradiation condition (for example, a scan speed of a beam or a blocking time of a pulsed beam), the application 702 for image simulation executes simulation of brightness of each pattern according to input of the above-described brightness modulation factors. The shape or arrangement of patterns is determined from the layout data or the images acquired in Step 602. The brightness information of respective regions segmented from the shape is estimated by simulation, and the brightness information obtained by simulation is assigned to each region.

The above-described simulation is executed in units of netlists, the data comparison application 701 compares the brightness information obtained for each netlist to the brightness information obtained in Step 603 (Step 802). The data comparison application 701 compares the brightness information obtained for each of the plurality of netlists to the brightness information obtained in Step 603, and selects brightness information having the minimum difference or satisfying a predetermined condition (for example, the difference in brightness information obtained in Step 603 is less than or equal to a predetermined value) (Step 803). The computer system 303 outputs defect information (or normal information) in a netlist corresponding to the selected brightness information as an inspection result (Step 804).

As described above, the defect information is described in the defect netlist. Therefore, a defect can be accurately specified by selection based on a comparison to an actual image. In addition, the output is not necessarily a defect name such as "normal", "defect type A", or "defect type B" and may be a classification with which abnormal defects can be separated. Further, as the defect type A and the defect type B, a difference in the size of individual electrical characteristics (resistance, capacitance, semiconductor characteristics) of a portion in a netlist or whether or not a plurality of patterns are connected may be output.

In the above-described embodiment, the example of obtaining the brightness information (characteristics) by simulation has been described. However, when a relationship between the netlist and the brightness information (electron microscope image) is known, defect classification may be performed by preparing a database storing the netlist and the electron microscope image in association with each other and comparing an actual image and the electron microscope image stored in the database to each other.

In addition, in the present embodiment, the example of calculating the brightness information from the netlist by simulation and comparing the calculated brightness information to the brightness information of an actual image has been described. However, defect classification may be performed by converting the brightness information obtained from an actual image into a netlist by simulation or the like and comparing the netlists to each other.

FIG. 9 is a diagram showing an example of a graphical user interface (GUI) screen on which an inspection condition during defect inspection (defect classification) and the derived inspection result (classification result) are displayed. In the input field of the inspection condition, an input field for a device condition such as an optical condition or a modulation condition, a field for selection of design data (layout data) of a semiconductor device as a target, a field for selection of a normal device netlist, and a field for selection of a plurality of defective device netlists for each defect type are provided. Through the input field for a device condition such as an optical condition or a modulation condition, the size of FOV, an acceleration voltage of an electron beam, a probe current of an electron beam, the number of frames (the cumulative number of images), a scan direction of a beam a scan speed of a beam, an blocking time of a pulsed beam, an irradiation time of a pulsed beam, and the like can be input. The application 702 for image simulation acquires brightness information (electron microscope image) based on the above-described input values. In addition, a classified defect distribution can be displayed on the display field of the inspection result.

FIG. 10 is a diagram showing an example of a GUI screen on which an actual image (electron beam irradiation result) and an estimated image (estimated irradiation result) that is estimated by simulation are displayed. In the example of FIG. 10, the rate of concordance of the images output from the data comparison application 701 is displayed. By performing the above-described display, an operator can verify the classification result.

Embodiment 3

FIG. 11 is a flowchart showing a process of estimating a defect type from a plurality of images acquired by performing beam scanning under different beam conditions (a scan speed of a beam or a blocking time of a pulsed beam). In the present embodiment, a plurality of images are acquired (Step 602) by setting a plurality of beam conditions (Step 1101). In the present embodiment, when the gate contact 109 is irradiated with a beam under different amounts of irradiation charge, the transition of brightness of the drain contact 110 is monitored. The amount of irradiation charge can be changed by adjusting, for example, the irradiation time or the amount of a current of a beam.

In the present embodiment, an example in which a process of irradiating the gate contact 109 with a beam for accumulating charge and subsequently irradiating the drain contact 110 with a beam for forming an image is repeated will be described.

FIG. 12 is a diagram showing an example of a GUI screen for displaying a graph representing the transition of brightness of the drain contact 110 depending on a change in the amount of irradiation charge of a beam with which the gate contact 109 is irradiated. As described above, when charge is accumulated in the gate electrode such that the gate is opened, the source and the drain are electrically connected. In the normal circuit, when charge is accumulated in the gate to some extent, the gate is opened and the source and the drain are electrically connected. Therefore, the drain contact 110 becomes brighter. In FIG. 12, No. 0 represents the transition of brightness of the normal equivalent circuit and shows a state where, when charge is accumulated to some extent, the brightness of the drain contact becomes high.

On the other hand, No. 1 in FIG. 12 shows a state where a low brightness state is maintained because the source and the drain are not electrically connected although charge is accumulated in the gate. This shows the possibility of an open defect in which the gate is not opened because the gate contact 109 and the gate electrode 105 are not in contact with each other. In addition, No. 2 in FIG. 12 shows a state where the gate is not opened unless a large amount of charge is applied to the gate electrode as compared to the normal circuit. This shows a state where charge leaks from the gate electrode 109 to the well 101 such that charge is not likely to be accumulated in the gate electrode 109. Further, No. 3 in FIG. 12 shows a state where the brightness of the drain contact is high irrespective of accumulation of charge in the gate electrode. The reason for this is presumed that charge leaks from the drain to the well such that the brightness of the drain contact is high irrespective of whether or not the gate is opened.

The above-described transition of brightness changes depending on defect types. Therefore, by evaluating the transition of brightness, defect type classification can be performed. In the flowchart shown in FIG. 11, the computer system 303 generates a curve (first S curve) shown in FIG. 12 (Step 1103) and subsequently generates a plurality of curves (second S curves) from the normal equivalent circuit netlist and one or more defective equivalent circuit netlists (Step 1104). In addition, the computer system 303 compares the first S curve and the second S curves (Step 1105) to each other and outputs defect information (or normal information) of a netlist corresponding to the second S curve having the highest rate of concordance (Steps 1106 and 1107).

In the above-described configuration, electrical characteristics of a semiconductor element can be evaluated. FIG. 12 illustrates an example of calculating the rate of concordance with respect to the S curve indicating normality. However, whether or not a defect is present may be determined based on the rate of concordance without generating the S curve from the defective equivalent circuit netlist. In addition, the shape of the S curve has a characteristic that varies depending on defect types. Therefore, by acquiring shape information of the S curves corresponding to defect types in advance, a defect type may be determined according to the rate of concordance of each of the S curves.

Embodiment 4

FIG. 13 is a diagram showing an example of an electrical characteristic derivation system in which a netlist group including a plurality of netlists is prepared in units of manufacturing processes of a semiconductor. In the system shown in FIG. 13, by comparing brightness information obtained from an actual image and brightness information obtained from a netlist group to each other, not only a defect type but also a manufacturing process that brings about a defect can be specified.

For example, a storage medium 1301 of a process A abnormal equivalent circuit netlist group stores a plurality of netlists including a poor film quality defect of a magnetic tunnel junction (MTJ) of STT-MRAM. When it is determined that the poor film quality defect of MTJ occurs mainly due to insufficient adjustment of a manufacturing condition of a process A, a plurality of netlists including the corresponding defect are stored, and a brightness information group derived from the netlists and brightness information extracted from an actual image are compared to each other to determine whether or not the adjustment of the process A is insufficient.

More specifically, a netlist group is stored for each of the process A, a process B, and a process C, a brightness information group derived from each of the groups is compared to the brightness information derived from an actual image, and a process relating to group having brightness information close to the brightness information derived from an actual image is determined. As a result, a process that brings about the defect is determined.

The computer system 303 performs the above-described determination, for example, along the flowchart shown in FIG. 8. In Step 802, the brightness information group for each netlist group and the brightness information obtained from an actual image are compared to each other. In Step 803, a group having brightness information close to the brightness information obtained from an actual image or a group to which the brightness information obtained from an actual image belongs is selected. In Step 804, a process name corresponding to the selected group is output. In addition, the probability of a process depending on the closeness to each of the groups may be output. Further, when the corresponding process is not present, the result of the determination may be "Others".

In the above-described computer system, a manufacturing process that brings about a defect can be specified. When a STT-MRAM is a target, it is considered that a plurality of netlists including a carrier loss defect is stored in a storage medium 1302 of a process B abnormal equivalent circuit netlist group, and a plurality of netlists including a gate insulating film quality defect is stored in a storage medium 1303 of a process C abnormal equivalent circuit netlist group.

FIG. 14 is a diagram showing an example of a GUI screen which is different from the GUI screen shown in FIG. 8 in that a netlist group can be selected as an inspection condition for each of different processes. Netlist groups that are managed in units of processes can be selected, and characteristics derived from the netlist groups and characteristics derived from an actual image can be compared to each other. As a result, an abnormal process can be easily specified.

Embodiment 5

As described in Embodiment 4, when an adjustment parameter of an abnormal process or a manufacturing apparatus relating to the abnormal process can be acquired from image data or characteristics (for example, brightness information) extracted from the image data, the manufacturing condition can be rapidly adjusted. In the present embodiment, a system that specifies an adjustment parameter of an abnormal process or a manufacturing apparatus relating to the abnormal process by inputting image data or characteristics extracted from the image data will be described.

FIG. 15 is a diagram showing an example of the system that estimates the abnormal process or the like. FIG. 15 is a functional block diagram. A computer system 1501 shown in FIG. 15 is a machine learning system, includes one or more processors, and is configured to execute one or more arithmetic modules stored in a predetermined storage medium. In addition, an estimation process described below may be performed using an AI accelerator. The computer system 1501 shown in FIG. 15 includes an input unit 1503 to which the teacher data provided for learning or data required for the estimation process is input from a storage medium 1502 or an input device 1503.

A learning device 1504 built in the computer system 1501 receives, as the teacher data, a combination of at least one of image data input from the input unit 1503 and a characteristic of an image extracted from an image processing apparatus (not shown), a beam irradiation condition (inspection condition) of the charged particle beam apparatus, and information (sample information) regarding a type of a sample and an element formed on the sample. Further, the learning device 1504 also receives process abnormality information. Examples of the process abnormality information include a process that was determined as a defect in the past and was fed back to a manufacturing apparatus to correct the defect or a parameter of the process that was fed back to the manufacturing apparatus. This information is stored in a predetermined storage medium as a data set in order to make this information function as teacher data to be learned by the learning device.

The characteristic of the image is, for example, brightness or a contrast of a specific pattern and can be obtained by extracting brightness information of a pattern specified by pattern matching or the like or a specific pattern segmented by semantic segmentation or the like. As the learning device, for example, a neural network, a regression tree, or a Bayes identifier can be used.

In addition, the beam irradiation condition is a blocking time or an irradiation time of a pulsed beam. The learning device 1504 reads the inspection recipe from the charged particle beam apparatus or receives an input from the input device 1505 to receive this data as a part of the teacher data.

The learning device 1504 executes machine learning using the received teacher data. A learning model storage unit 1506 stores a learning model that is constructed by the learning device 1504. The learning model constructed by the learning device 1504 is transmitted to an abnormal process estimation unit 1507 and is used for estimating the abnormal process.

In the abnormal process estimation unit 1507, based on the learning model constructed by the learning device 1504, the abnormal process or a parameter to be fed back is estimated from the input image data or the characteristics extracted from the image data, and the input sample and inspection information.

By performing the estimation using the learning model that is learned as described above, the manufacturing apparatus can be rapidly adjusted.

Embodiment 6

FIG. 16 is a diagram showing another system for deriving electrical characteristics of a sample. FIG. 17 is a top view of a sample on which a DRAM that is one type of a semiconductor element to be inspected is formed. The DRAM is an element that charges a capacitor (storage node) using a voltage applied to a bit line 1703 by increasing a voltage applied to a word line 1702 and applying a gate voltage to a transistor. Here, in an image shown in FIG. 17, the description will be made assuming that a word line contact 1701 (WLC) and a storage node contact 1705 (SNC) are seen and a portion indicated by a dotted line such as a diffusion layer 1704 is not seen.

In the present embodiment, an example of evaluating the durability (reliability) of the DRAM by applying stress to the transistor multiple times through the word line contact 1701 will be described. FIG. 18 is a flowchart showing a DRAM reliability evaluation process.

First, a sample moves to coordinates registered in the recipe, and images are acquired so as to include both WLC and SNC (Steps 601 and 602). Using the images acquired in Step 602, the positions of the WLC (first terminal) and the SNC (second terminal) are specified, and then the WLC is irradiated with a beam for stress application (Step 1801). In the present embodiment, the example of using a beam emitted from the electron source of the scanning electron microscope as the beam for stress application has been described. However, another electron source for stress application or a light source that emits light for stress application may be provided in a sample chamber of the scanning electron microscope and stress may be applied by using such a beam source.

Next, the SNC is irradiated with a beam for image acquisition to acquire images (Step 1802). By repeating the stress application and the image acquisition, a S curve is generated as shown in No. 1 in FIG. 19 (Step 1803). FIG. 19 is a diagram showing an example of a GUI screen through which a reliability determination result of a semiconductor element is displayed as an inspection result. When the voltage applied to the gate through the WLC exceeds a threshold, the gate is opened, and thus the SNC becomes bright. On the other hand, when characteristics deteriorate due to a hot carrier effect, the voltage applied to the gate effectively decreases to the threshold or lower, the gate is closed, and thus the SNC becomes dark.

A threshold for evaluating the reliability of an element is set from the number of times of stress application and a change in a parameter (brightness), and whether or not the characteristics deteriorate (the characteristics exceed or fall below the threshold) before reaching a reliability guarantee time (number of times) is determined. The computer system 303 reads a threshold from a reliability database 1601 depending on the type of a semiconductor element or an inspection condition, and determines whether or not the characteristics exceed (or fall below) the threshold. When the characteristics exceed (or fall below) the threshold, the computer system 303 determines that the element to be inspected is normal, and When the characteristics fall below (or exceed) the threshold, the computer system 303 determines that the element to be inspected is defective (Steps 1804, 1805, and 1806).

No. 2 in FIG. 19 shows an example in which a terminal that supposed to be energized and typically looks bright is displayed dark because voids in the terminal migrate due to an electromigration phenomenon caused by the irradiation of the beam for stress application such that the contact is disconnected. In this way, by setting an appropriate threshold for a phenomenon inducing a defect and evaluating characteristics when a predetermined number of times or a predetermined amount of stress application is performed, the reliability of the semiconductor element can be evaluated.

Further, a defect type can be determined using a characteristic amount extracted from a relationship between the number of times of stress application and the brightness. For example, a hot carrier effect and an electromigration phenomenon can be distinguished from each other using a difference between the shapes of the S curves shown in No. 1 and No. 2 of FIG. 19.

Embodiment 7

Figure 20A:
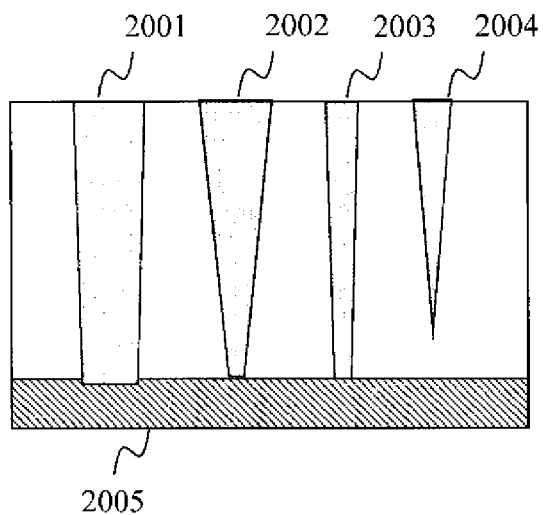
FIGS. 20A and 20B show an electron microscope image in which a plurality of plugs including a defect are displayed and a cross-section of the electron microscope image.
Figure 20B:
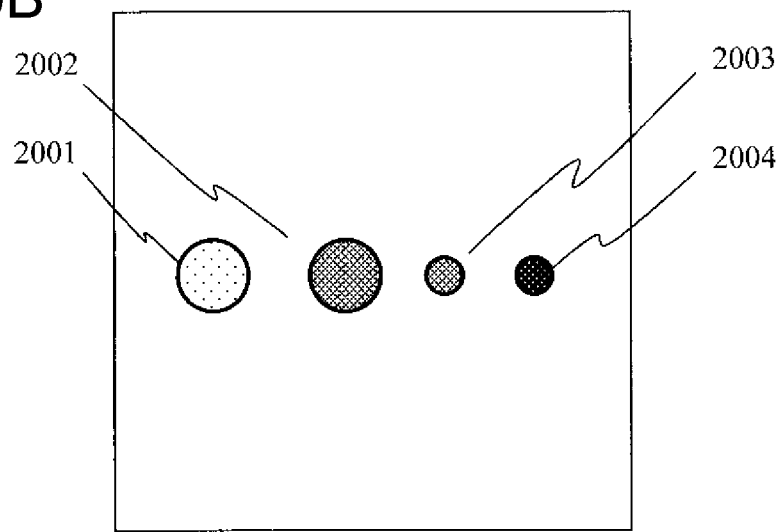

In the present embodiment, a system that specifies (classifies) a type of a defect based on a combination of the brightness information of a pattern and the dimension or shape information of the pattern will be described. (a) of FIG. 20 is a cross-sectional view of a lower wiring 2005 and four plugs connected to the lower wiring. (b) of FIG. 20 is a top view of the four plugs. Among the four plugs, plugs 2003 and 2004 are dimension defects in which the dimensions of the patterns in a top view are less than those of the plugs 2001 and 2002. In addition the plugs 2002 and 2004 taper defects in which the tapers thereof are larger than those of the plugs 2001 and 2003. When this sample is irradiated with a beam, the brightness of the plug is inversely proportional to the amount of charge in the plug. In addition, the amount of charge in the plug is inversely proportional to a junction area between the plug and the lower wiring. Further, the junction area between the plug and the lower wiring is proportional to the pattern dimension of the uppermost surface and is inversely proportional to the taper. As a result, the brightness of the plug is proportional to the pattern dimension in a top view and is inversely proportional to the taper. For example, among the four plugs of FIG. 20, the plug 2001 having a large pattern dimension in a top view and a small taper angle has the highest brightness, the plug 2002 having a large pattern dimension in a top view and a large taper angle and the plug 2003 having a small pattern dimension in a top view and a small taper angle have the second highest brightness, and the plug 2004 having a small pattern dimension in a top view and a large taper angle has the lowest brightness. Accordingly, the dimension defect, the taper defect, and the composite defect of the dimension and taper can be classified based on the combination of the brightness information of the pattern of the uppermost surface and the dimension information.

FIG. 21 is a diagram showing an example of the system that classifies a type of a defect based on the brightness information of the pattern and the dimension or shape information of the pattern. The computer system 303 is communicably connected to a design data storage medium 2101 that stores design data (layout data) of a semiconductor device. A pattern shape evaluation application 2102 stored in the memory 306 compares, for example, the layout data read from the design data storage medium 2101 and a pattern included in an actual image to each other and calculates shape information (a pattern size, a dimension, a ratio of the size to the layout data, or a magnitude relationship with the layout data).

A defect classification application 2103 specifies a defect type by referring to a database storing the combination of the shape information of the pattern and the brightness information and the type of the defect in association with each other. For example, as shown in FIG. 20, the plugs 2002 and 2003 have the same brightness and different pattern dimensions in a top view. Therefore, the plug 2002 is specified as a taper defect and the plug 2003 is specified as a dimension defect.

By referring to not only the brightness but also other characteristics such as a dimension or a shape, the number of categories of defect classification can be increased.

Embodiment 8

As described using FIG. 1, unique brightness information derived from a scan direction or an irradiation order of the beam with respect to a plurality of patterns can be obtained depending on types of defects. As shown in FIG. 1, when beam scanning is performed from one direction, the open defect or the like of the gate contact can be specified. However, in the case of the junction leakage defect of the drain, simply by scanning from the left side to the right side, it is difficult to determine whether the reason why the drain contact becomes brighter is that the gate is opened by irradiation of the gate with a beam or that charge is not accumulated due to leakage.

In the present embodiment, as shown in FIG. 22, a system or the like that specifies a type of a defect by performing beam scanning in a plurality of directions (in the present embodiment, both directions) instead of beam scanning in one direction and referring to, for a combination of brightness of a plurality of patterns, a database storing related information between the combination of the brightness and types of defects will be described.

As shown in FIG. 22, by performing scanning along the scanning trajectory 111 (moving an irradiation point in a first direction to sequentially irradiate a plurality of patterns with a beam) and performing scanning along a scanning trajectory 2201 (moving an irradiation point in a second direction to sequentially irradiate a plurality of patterns with a beam), for example, when junction leakage occurs in the drain, the drain contact 110 becomes brighter due to the leakage although the gate contact 109 is not yet irradiated with a beam. Here, it is desirable to perform the scanning along the scanning trajectory 2201 after relaxing charge generated in the sample due to the scanning along the scanning trajectory 111.

The computer system 303 specifies a type of a defect by storing a database in advance which stores association between a combination of brightness information during beam scanning on plurality of patterns in a plurality of directions and types of defects in advance and referring to the database for a combination of brightness information extracted from an actual image that is acquired by beam scanning in a plurality of directions. In this way, by performing beam scanning in a plurality of directions, a type of a defect that cannot be specified by scanning in one direction can also be specified.

REFERENCE SIGNS LIST

1: electron beam source
2: condenser lens
3: diaphragm
4: pulsed electron generator
5: deflector
6: objective lens
7: sample electric field controller
8: detector
9: output adjustment circuit
10: sample stage
11: sample
21: acceleration voltage controller
22: irradiation current controller
23: pulse irradiation controller
24: deflection controller
25: focusing controller
26: sample electric field controller
27: stage position controller
28: control transmitter
31: detection signal processing unit
32: detection signal analysis unit
33: image or electrical characteristic display unit
34: database
41: operation interface

The invention claimed is:

1. An inspection system for a semiconductor wafer that is configured to be communicable with an image acquisition tool and inspects an electric circuit formed on a semiconductor wafer from image data acquired from the image acquisition tool or characteristics extracted from the image data, the system comprising:
    a computer system; and
    an arithmetic module that is executed by the computer system;
    wherein the computer system
        receives, from the image acquisition tool, image data obtained by sequentially irradiating a plurality of contacts included in a transistor provided on the semiconductor wafer with a beam moving irradiation points at respectively different timings, and extracts characteristics of the plurality of contacts sequentially irradiated with the beam from the image data, the characteristics being included in the image data, or receives characteristics of the plurality of contacts sequentially irradiated with the beam, the characteristics being extracted from the image data; and
        outputs reliability information by referring to related information with the characteristics of the plurality of contacts,
    wherein the related information stores, mutually associated with each other,
        the characteristics of the plurality of contacts extracted from image data that is acquired by sequentially irradiating the plurality of contacts with the beam moving the irradiation points at the respectively different timings, and
        reliability information of the transistor;
    wherein the reliability information includes any of information related to a guaranteed operating time of the transistor, information related to a number of times of guaranteed operation of the transistor, information related to characteristics deterioration of the transistor, information related to whether the transistor is normal, or information related to whether the transistor is defective; and
    wherein the information related to the characteristics deterioration of the transistor is characteristic deterioration information with respect to stress caused by irradiating the beam onto the plurality of contacts.

2. The inspection system for the semiconductor wafer according to claim 1,
    wherein the characteristics of the plurality of contacts are obtained when a beam irradiation point of the image acquisition tool is moved in a plurality of directions relative to the plurality of contacts.

3. The inspection system for the semiconductor wafer according to claim 1,
    wherein the related information is a database storing a plurality of characteristics and the reliability information of the transistor in association with each other, the plurality of characteristics being obtained by sequentially irradiating the plurality of contacts included in the semiconductor device with the beam.

4. The inspection system for the semiconductor wafer according to claim 1,
    wherein the plurality of contacts includes two or more from a source contact, a gate contact, and a drain contact.

5. The inspection system for the semiconductor wafer according to claim 4,
    wherein, by charge being accumulated in the gate contact, the gate of the transistor is opened or the source and the drain of the transistor are electrically connected.

6. The inspection system for the semiconductor wafer according to claim 1,
Wherein the image data is data obtained by beam scanning of the image acquisition tool such that the plurality of contacts are included in a field of view.

7. The inspection system for the semiconductor wafer according to claim 6,
wherein the image data is data obtained by beam scanning of the image acquisition tool in an arrangement direction of the plurality of contacts according to an arrangement order.

8. The inspection system for the semiconductor wafer according to claim 1,
wherein the image data is a voltage contrast image data.

9. The inspection system for the semiconductor wafer according to claim 1,
wherein the plurality of contacts includes a word line contact and a storage node contact connected to the transistor.

10. The inspection system for the semiconductor wafer according to claim 9,
wherein the computer system extracts characteristics of a plurality of storage node contacts from a plurality of image data related to the storage node contacts obtained upon repeatedly sequentially irradiating the word line contact and the storage node contact with the beam, and outputs the reliability information based on extracted characteristics of the plurality of storage node contacts.

11. An inspection system for a semiconductor wafer that is configured to be communicable with an image acquisition tool and inspects a transistor formed on a semiconductor wafer from image data acquired from the image acquisition tool or characteristics extracted from the image data, the system comprising:
a computer system; and
an arithmetic module that is executed by the computer system;
wherein the computer system
receives, from the image acquisition tool, the image data obtained by irradiating, with a beam moving irradiation points at respectively different timings, a storage node contact connected to the transistor as a number of times of irradiating, with the beam for applying stress, a word line contact connected to the transistor increases and extracts characteristics of a plurality of storage node contacts from the received image data, the characteristics being included in the image data, or receives characteristics of the plurality of storage node contacts, the characteristics being extracted from the image data; and
outputs reliability information of the transistor by referring to related information with the characteristics of the plurality of storage node contacts, wherein the related information stores, mutually associated with each other,
the characteristics of the plurality of storage node contacts extracted from image data that is acquired by sequentially irradiating the plurality of storage node contacts with the beam moving the irradiation points at the respectively different timings, and
reliability information of the transistor;
wherein the reliability information includes any of information related to a guaranteed operating time of the transistor, information related to a number of times of guaranteed operation of the transistor, information related to characteristics deterioration of the transistor, information related to whether the transistor is normal, or information related to whether the transistor is defective; and
wherein the information related to the characteristics deterioration of the transistor is characteristic deterioration information with respect to stress caused by irradiating the beam onto the plurality of storage node contacts.

12. A non-transitory computer-readable medium storing a program that is configured to instruct a processor to:
receive, from an image acquisition tool, image data obtained by sequentially irradiating a plurality of contacts included in a transistor provided on a semiconductor wafer with a beam moving irradiation points at respectively different timings and further to extract characteristics of the plurality of contacts sequentially irradiated with a beam from the image data, the characteristics being included in the image data, or to receive the characteristics of the plurality of contacts sequentially irradiated with the beam, the characteristics being extracted from the image data; and
output reliability information by referring to related information with the characteristics of the plurality of contacts, wherein the related information stores, mutually associated with each other,
the characteristics of the plurality of contacts extracted from image data that is acquired by sequentially irradiating the plurality of contacts with the beam moving the irradiation points at the respectively different timings, and
reliability information of the transistor;
wherein the reliability information includes any of information related to a guaranteed operating time of the transistor, information related to a number of times of guaranteed operation of the transistor, information related to characteristics deterioration of the transistor, information related to whether the transistor is normal, or information related to whether the transistor is defective; and
wherein the information related to the characteristics deterioration of the transistor is characteristic deterioration information with respect to stress caused by irradiating the beam onto the plurality of contacts.

13. A non-transitory computer-readable medium storing a program that is configured to instruct a processor to:
receive, from an image acquisition tool, image data obtained by irradiating, with a beam moving irradiation points at respectively different timings, a storage node contact connected to a transistor as a number of times of irradiating, with the beam for applying stress, a word line contact connected to the transistor increases and further to extract characteristics of a plurality of storage node contacts from the received image data, the characteristics being included in the image data, or to receive the characteristics of the plurality of storage node contacts, the characteristics being extracted from the image data; and
output reliability information of the transistor by referring to related information with the characteristics of the plurality of storage node contacts, wherein the related information stores, mutually associated with each other,
characteristics of the plurality of storage node contacts extracted from image data that is acquired by sequentially irradiating the plurality of storage node contacts with the beam moving the irradiation points at the respectively different timings, and reliability information of the transistor;

wherein the reliability information includes any of information related to a guaranteed operating time of the transistor, information related to a number of times of guaranteed operation of the transistor, information related to characteristics deterioration of the transistor, information related to whether the transistor is normal, or information related to whether the transistor is defective; and wherein the information related to the characteristics deterioration of the transistor is characteristic deterioration information with respect to stress caused by irradiating the beam onto the plurality of storage node contacts.

14. The inspection system for the semiconductor wafer according to claim 1, wherein the reliability information includes information that indicates a relationship between a change in irradiated charge amount of the beam irradiated to the plurality of contacts and a change in characteristic of the plurality of contacts.

* * * * *